US012254830B2

(12) United States Patent
Park et al.

(10) Patent No.: US 12,254,830 B2
(45) Date of Patent: Mar. 18, 2025

(54) PIXEL AND DISPLAY DEVICE

(71) Applicant: Samsung Display Co., Ltd., Yongin-si (KR)

(72) Inventors: Junhyun Park, Suwon-si (KR); Jangmi Kang, Seoul (KR); Minjae Jeong, Hwaseong-si (KR); Meehye Jung, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/521,418

(22) Filed: Nov. 28, 2023

(65) Prior Publication Data

US 2024/0096282 A1 Mar. 21, 2024

Related U.S. Application Data

(62) Division of application No. 17/709,906, filed on Mar. 31, 2022, now Pat. No. 11,875,741.

(30) Foreign Application Priority Data

Jul. 12, 2021 (KR) ........................ 10-2021-0091251

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
None
See application file for complete search history.

(56) References Cited

U.S. PATENT DOCUMENTS 9,401,112 B2 7/2016 Ohara et al.
9,818,344 B2 * 11/2017 Lin .................... H01L 27/1225
(Continued)

FOREIGN PATENT DOCUMENTS

CN 112599097 A 4/2021
KR 1020160052942 A 5/2016
(Continued)

OTHER PUBLICATIONS

Extended European Search Report for Application No. 22183566.3-1207 dated Nov. 8, 2022.

*Primary Examiner* — Dorothy Harris
(74) *Attorney, Agent, or Firm* — CANTOR COLBURN LLP

(57) ABSTRACT

A pixel includes: a light emitting diode; a first transistor; a first capacitor connected between a first node and a gate electrode of the first transistor; a second transistor including a first electrode electrically connected to the gate electrode of the first transistor, a second electrode and a gate electrode which receives a first scan signal; and a third transistor including a first electrode electrically connected to the second electrode of the second transistor, a second electrode electrically connected to a third voltage line, and a gate electrode which receives a second scan signal. During an initialization period, an initialization voltage provided from the third voltage line is provided to the gate electrode of the first transistor through the third and second transistors, and, when the initialization period is terminated, at least one of the second transistor and the third transistor is turned off.

7 Claims, 31 Drawing Sheets

(52) U.S. Cl.
CPC ............... *G09G 2300/0852* (2013.01); *G09G 2300/0861* (2013.01); *G09G 2310/08* (2013.01); *G09G 2320/0233* (2013.01); *G09G 2320/0238* (2013.01); *G09G 2340/0435* (2013.01)

(56) References Cited

U.S. PATENT DOCUMENTS

| | | | | |
|---|---|---|---|---|
| 9,823,729 | B2 | 11/2017 | An et al. | |
| 10,490,136 | B2 | 11/2019 | Zhu et al. | |
| 11,056,048 | B2 | 7/2021 | Nam | |
| 11,232,756 | B2 | 1/2022 | Jang et al. | |
| 2006/0156121 | A1* | 7/2006 | Chung | G09G 3/3233 714/726 |
| 2007/0195022 | A1 | 8/2007 | Maede et al. | |
| 2014/0098083 | A1 | 4/2014 | Lee et al. | |
| 2015/0379930 | A1 | 12/2015 | Lee et al. | |
| 2016/0125809 | A1 | 5/2016 | Hwang | |
| 2016/0133191 | A1 | 5/2016 | Kang et al. | |
| 2016/0321990 | A1 | 11/2016 | Kim et al. | |
| 2016/0351122 | A1* | 12/2016 | Jung | G09G 3/3233 |
| 2018/0075808 | A1 | 3/2018 | Yamashita et al. | |
| 2018/0268757 | A1 | 9/2018 | Chen et al. | |
| 2018/0374425 | A1 | 12/2018 | Jeong et al. | |
| 2019/0096337 | A1* | 3/2019 | Zhu | G09G 3/3258 |
| 2019/0287452 | A1 | 9/2019 | Wang | |
| 2019/0295469 | A1 | 9/2019 | Umezawa et al. | |
| 2020/0226978 | A1 | 7/2020 | Lin et al. | |
| 2020/0243023 | A1 | 7/2020 | Fan et al. | |
| 2021/0049959 | A1 | 2/2021 | Park et al. | |
| 2021/0201759 | A1* | 7/2021 | Cho | G09G 3/3233 |
| 2021/0201782 | A1 | 7/2021 | Jang et al. | |
| 2022/0101785 | A1 | 3/2022 | Chung et al. | |
| 2023/0028312 | A1 | 1/2023 | Wang et al. | |

FOREIGN PATENT DOCUMENTS

| | | | |
|---|---|---|---|
| KR | 102179312 | B1 | 11/2020 |
| KR | 1020200133886 | A | 12/2020 |
| KR | 1020210083827 | A | 7/2021 |

* cited by examiner

PIXEL AND DISPLAY DEVICE

This application is a divisional of U.S. patent application Ser. No. 17/709,906, filed on Mar. 31, 2022, which claims priority to Korean Patent Application No. 10-2021-0091251, filed on Jul. 12, 2021, and all the benefits accruing therefrom under 35 U.S.C. § 119, the content of which in its entirety is herein incorporated by reference.

BACKGROUND

The present disclosure relates to a pixel and a display device including the same.

An organic light emitting display device among display devices displays an image using an organic light emitting diode that emits light by recombination of electrons and holes. The organic light emitting display has advantages of fast response speed and low power consumption.

The organic light emitting display device includes pixels connected to data lines and scan lines. Typically, each of the pixels includes an organic light emitting diode and a circuit unit for controlling the amount of current flowing through the organic light emitting diode. The organic light emitting diode generates light of prescribed brightness in correspondence to the amount of current transferred from the circuit unit.

SUMMARY

The present disclosure provides a pixel and a display device capable of operating at various driving frequencies.

An embodiment of the present invention provides a pixel including: a first transistor including a first electrode electrically connected to a first voltage line which receives a first voltage, a second electrode, and a gate electrode; a first capacitor connected between a first node and the gate electrode of the first transistor; a light emitting diode including a first electrode electrically connected to the second electrode of the first transistor, and a second electrode connected to a second voltage line which receive a second voltage; a second transistor including a first electrode electrically connected to the gate electrode of the first transistor, a second electrode, and a gate electrode which receives a first scan signal; and a third transistor including a first electrode electrically connected to the second electrode of the second transistor, a second electrode electrically connected to a third voltage line, and a gate electrode which receives a second scan signal. During an initialization period, an initialization voltage provided from the third voltage line is provided to the gate electrode of the first transistor through the third transistor and the second transistor, and, when the initialization period is terminated, at least one of the second transistor and the third transistor is turned off.

In an embodiment of the present invention, a display device includes: a pixel connected to a first scan line, a second scan line, and a data line; a scan driving circuit which outputs a first scan signal and a second scan signal to the first scan line and the second scan line, respectively; a data driving circuit which outputs a data signal to the data line during a driving period, and to output a bias signal to the data line during a bias period; and a driving controller which controls the scan driving circuit and the data driving circuit. The pixel includes: a first transistor including a first electrode electrically connected to a first voltage line which receives a first voltage, a second electrode, and a gate electrode; a first capacitor connected between a first node and the gate electrode of the first transistor; a light emitting diode including a first electrode electrically connected to the second electrode of the first transistor, and a second electrode connected to a second voltage line which receives a second voltage; a second transistor including a first electrode electrically connected to the gate electrode of the first transistor, a second electrode, and a gate electrode which receives the first scan signal; and a third transistor including a first electrode electrically connected to the second electrode of the second transistor, a second electrode electrically connected to a third voltage line, and a gate electrode which receives the second scan signal. During an initialization period in the driving period, an initialization voltage provided from the third voltage line is provided to the gate electrode of the first transistor through the third transistor and the second transistor, and, during the bias period, at least one of the second transistor and the third transistor is turned off.

In an embodiment of the present invention, a pixel includes: a first transistor including a first electrode electrically connected to a first voltage line which receives a first voltage, a second electrode, and a gate electrode; a first capacitor connected between a first node and the gate electrode of the first transistor; a light emitting diode including a first electrode electrically connected to the second electrode of the first transistor, and a second electrode connected to a second voltage line which receives a second voltage; a second transistor including a first electrode electrically connected to the gate electrode of the first transistor, a second electrode connected to a third voltage line, and a gate electrode which receives a first scan signal; and a third transistor including a first electrode electrically connected to the first electrode of the first transistor, a second electrode connected to the first node, and a gate electrode which receives a second scan signal where, during each of an initialization period and a compensation period, an initialization voltage provided from the third voltage line is provided to the gate electrode of the first transistor through the second transistor, and, the third transistor is in a turn-on state in each of the initialization period and the compensation period.

BRIEF DESCRIPTION OF THE FIGURES

The accompanying drawings are included to provide a further understanding of the present invention, and are incorporated in and constitute a part of this specification. The drawings illustrate embodiments of the present invention and, together with the description, serve to explain principles of the present invention. In the drawings.

DETAILED DESCRIPTION

Figure 1:
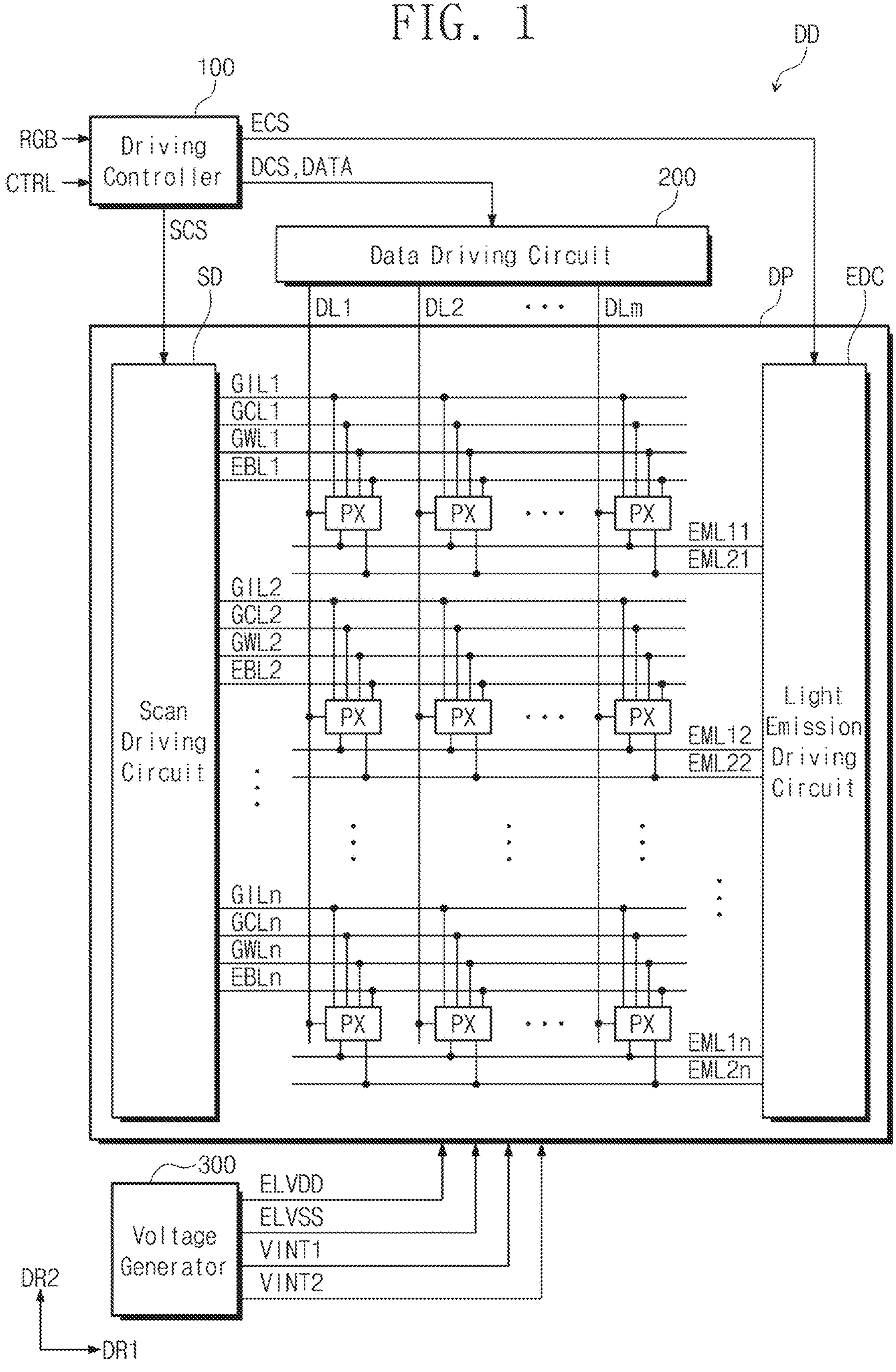
FIG. 1 is a block diagram of a display device according to an embodiment of the present invention.

It will be understood that when an element or layer is referred to as being "on", "connected to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes any and all combinations of one or more of the associated items.

Terms such as "first", "second", and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the present invention will be described with reference to the accompanying drawings.

FIG. 1 is a block diagram of a display device according to an embodiment of the present invention.

Referring to FIG. 1, the display device DD includes a display panel DP, a driving controller 100, a data driving circuit 200, and a voltage generator 300.

The driving controller 100 receives an image signal RGB and a control signal CTRL. The driving controller 100 generates an image data signal DATA in which a data format of the image signal RGB is converted to satisfy the interface specification with the data driving circuit 200. The driving controller 100 outputs a scan control signal SCS, a data control signal DCS, and a light emitting driving control signal ECS.

The data driving circuit 200 receives the data control signal DCS and the image data signal DATA from the driving controller 100. The data driving circuit 200 converts the image data signal DATA into data signals, and outputs the data signals to a plurality of data lines DL1 to DLm to be described later. The data signals have analog voltages corresponding to grayscale values of the image data signal DATA.

In this embodiment, the data driving circuit 200 may output the data signals corresponding to the image data signal DATA to data lines DL1 to DLm during a driving period DRP (refer to FIGS. 4 and 8) of one frame, and output bias signals to the data lines DL1 to DLm during a bias period BIP (refer to FIGS. 4 and 8) of one frame.

The voltage generator 300 generates voltages for an operation of the display panel DP. In this embodiment, the voltage generator 300 generates a first driving voltage ELVDD (or a first voltage), a second driving voltage ELVSS (or a second voltage), a first initialization voltage VINT1 (or a third voltage), and a second initialization voltage VINT2 (or a fourth voltage). In an embodiment, the first initialization voltage VINT1 may have a higher voltage level than the second initialization voltage VINT2. In an embodiment, the first initialization voltage VINT1 may have the same voltage level as the second initialization voltage VINT2.

The display panel DP includes scan lines GIL1 to GILn, GCL1 to GCLn, GWL1 to GWLn, and EBL1 to EBLn, light emission control lines EML11 to EML1*n* and EML21 to EML2*n*, the data lines DL1 to DLm, and pixels PX. The display panel DP may further include a scan driving circuit SD and a light emission driving circuit EDC. In an embodiment, the scan driving circuit SD is disposed in a first side of the display panel DP. The scan lines GIL1 to GILn, GCL1 to GCLn, GWL1 to GWLn, and EBL1 to EBLn extend in the first direction DR1 from the scan driving circuit SD.

The light emission driving circuit EDC is disposed in a second side of the display panel DP. The light emission control lines EML1*l* to EML1*n* and EML2*l* to EML2*n* extend in the opposite direction to the first direction DR1 from the light emission driving circuit EDC.

The scan lines GIL1 to GILn, GCL1 to GCLn, GWL1 to GWLn, and EBL1 to EBLn, and the light emission control lines EML11 to EML1*n* and EML21 to EML2*n* are spaced apart from each other in the second direction DR2. The data lines DL1 to DLm extend from the data driving circuit 200 in the opposite direction to the second direction DR2, and are arrayed to be spaced apart from each other in the first direction DR1.

In the example shown in FIG. 1, the scan driving circuit SD is disposed to face the light emission driving circuit EDC having the pixels PX interposed therebetween, but the embodiment of the present invention is not limited thereto. For example, the scan driving circuit SD and the light emission driving circuit EDC may be disposed to be adjacent to any one of the first side and the second side of the display panel DP. In an embodiment, the scan driving circuit SD and the light emission driving circuit EDC may be configured from one circuit.

A plurality of pixels PX are electrically connected to the scan lines GIL1 to GILn, GCL1 to GCLn, GWL1 to GWLn, and EBL1 to EBLn, the light emission control lines EML11 to EML1*n* and EML21 to EML2*n*, and the data lines DL1 to DLm. Each of the plurality of pixels PX may be electrically connected to four scan lines and two light emission control lines. For example, as shown in FIG. 1, the pixels PX in a first row may be connected to the scan lines GILL GCL1, GWL1 and EBL1, and the light emission control lines EML11 and EML21. In addition, the pixels PX in a second row may be connected to the scan lines GIL2, GCL2, GWL2 and EBL2, and the light emission control lines EML12 and EML22.

Each of the plurality of pixels PX includes a light emitting diode ED (refer to FIG. 2) and a pixel circuit unit which control light emission of the light emitting diode ED. The pixel circuit unit may include one or more transistors and one or more capacitors. The scan driving circuit SD and the light emission driving circuit EDC may include transistors formed through the same process as that of the transistors of the pixel circuit unit.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. In response to the scan control signal SCS, the scan driving circuit SD may output the scan signals to the scan lines GIL1 to GILn, GCL1 to GCLn, GWL1 to GWLn, and EBL1 to EBLn.

In response to the light emission driving control signal ECS from the driving controller 100, the light emission driving circuit EDC may output the light emission control signals to the light emission control lines EML11 to EML1*n* and EML21 to EML2*n*.

The driving controller 100 according to an embodiment of the present invention may determine a driving frequency, and control the data driving circuit 200, the scan driving circuit SD, and the light emission driving circuit EDC according to the determined driving frequency.

Figure 2:
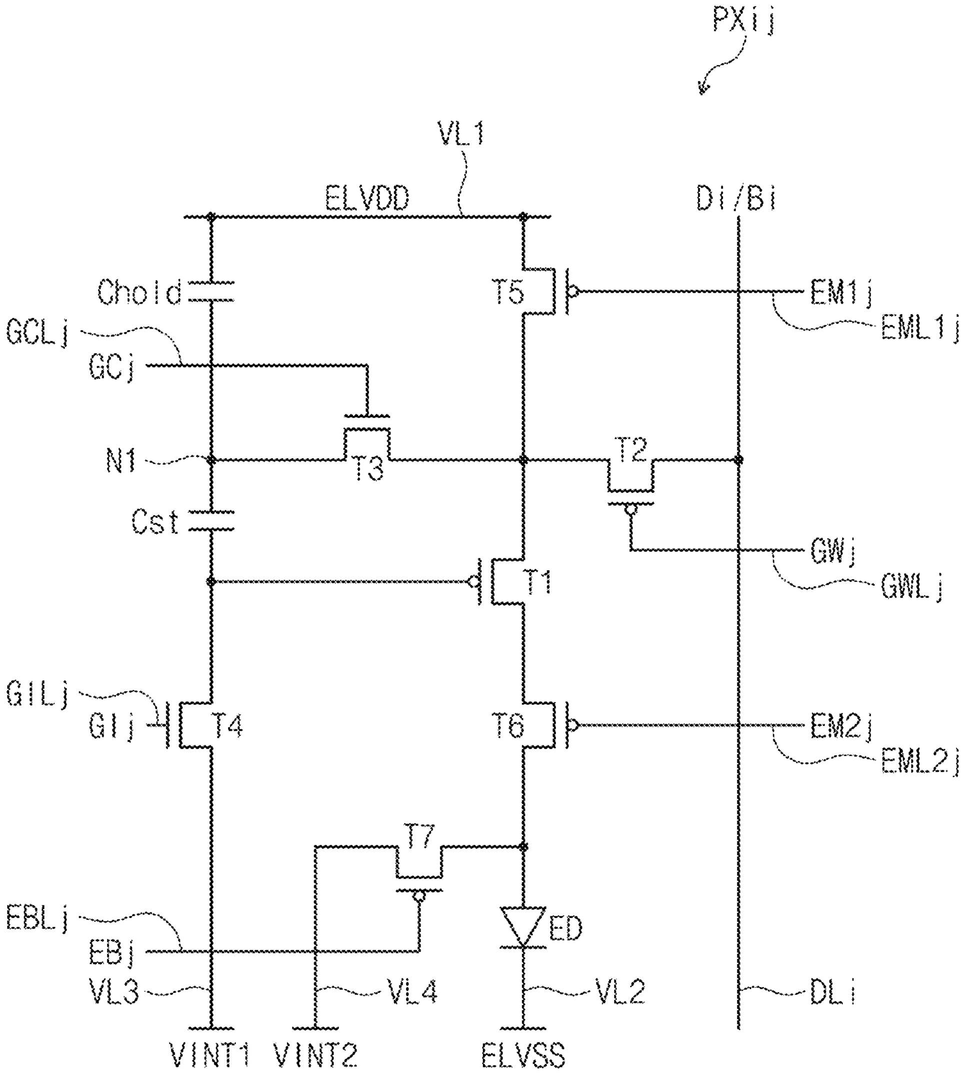
FIG. 2 is an equivalent circuit diagram of a pixel according to an embodiment of the present invention.

FIG. 2 is an equivalent circuit diagram of a pixel according to an embodiment of the present invention.

FIG. 2 illustrates an equivalent circuit diagram of a pixel PXij connected to an i-th data line DLi among the data lines DL1 to DLm shown in FIG. 1, j-th scan lines GILj, GCLj, GWLj and EBLj among the scan lines GIL1 to GILn, GCL1 to GCLn, GWL1 to GWLn, and EBL1 to EBLn, and j-th light emission control lines EML1*j* and EML2*j* among the light emission control lines EML11 to EML1*n* and EML21 to EML2*n*.

Each of the plurality of pixels PX shown in FIG. 1 may have the same circuit configuration as shown in the equivalent circuit diagram of the pixel PXij shown in FIG. 2.

Referring to FIG. 2, the pixel PXij of the display device according to an embodiment includes the first to seventh transistors T1, T2, T3, T4, T5, T6 and T7, capacitors Cst and Chold, and at least one light emitting diode ED. This embodiment describes an example in which one pixel PXij includes one light emitting diode ED.

In this embodiment, each of the first, the second, the fifth, the sixth and the seventh transistors T1, T2, T5, T6 and T7 among the first to seventh transistors T1 to T7 may be a P-type transistor having a low-temperature polycrystalline silicon ("LTPS") semiconductor layer, and each of the third and fourth transistors T3 and T4 may be an N-type transistor having an oxide semiconductor as a semiconductor layer. In another embodiment, the entirety of the first to seventh transistors T1 to T7 may be P-type transistors, or N-type transistors. In another embodiment, at least one of the first to seventh transistors T1 to T7 may be a P-type transistor and the remaining transistors may be N-type transistors.

In addition, the circuit configuration of the pixel PXij according to an embodiment of the present invention is not limited to FIG. 2. The pixel PXij shown in FIG. 2 is merely exemplary, and the configuration of the pixel circuit PXij may be modified and practiced.

The scan lines GILj, GCLj, GWLj and EBLj may transfer the scan signals GIj, GCj, GWj and EBj, respectively, and the light emission control lines EML1*j* and EML2*j* may transfer the light emission control signals EM1*j* and EM2*j*, respectively. The data line DLi may transfer any one of the data signal Di and the bias signal Bi. The data signal Di may have a voltage level corresponding to the image signal RGB input to the display device DD (refer to FIG. 1). The first to fourth voltage lines VL1, VL2, VL3 and VL4 may transfer the first driving voltage ELVDD, the second driving voltage ELVSS, the first initialization voltage VINT1 and the second initialization voltage VINT2, respectively.

The first transistor T1 includes a first electrode electrically connected to the first driving voltage line VL1 via the fifth transistor T5, a second electrode electrically connected to the anode of the light emitting diode ED via the sixth transistor T6, and a gate electrode.

The second transistor T2 includes a first electrode connected to the data line DLi, a second electrode connected to the first electrode of the first transistor T1, and a gate electrode connected to the scan line GWLj. The second transistor T2 may be turned on according to the scan signal GWj transferred through the scan line GWLj to transfer any one of the data signal Di and the bias signal Bi from the data line DLi to the first electrode of the first transistor T1.

The third transistor T3 includes a first electrode connected to the first electrode of the first transistor T1, a second electrode connected to a first node N1, and a gate electrode connected to the scan line GCLj. The third transistor T3 may be turned on according to the scan signal GCj transferred through the scan line GCLj to electrically connect the first electrode of the first transistor T1 and the first node N1.

The fourth transistor T4 includes a first electrode connected to the gate electrode of the first transistor T1, a second electrode connected to the third voltage line VL3 through which the first initialization voltage VINT1 is transferred, and a gate electrode connected to the scan line GILj. The fourth transistor T4 is turned on according to the scan signal GIj transferred through the scan line GILj to transfer the first initialization voltage VINT1 to the gate electrode of the first transistor T1. The first initialization voltage VINT1 may be a voltage for initializing the gate electrode of the first transistor T1.

The fifth transistor T5 includes a first electrode connected to the first voltage line VL1, a second electrode connected to the first electrode of the first transistor T1, and a gate electrode connected to the light emission control line EML1*j*. The fifth transistor T5 may be turned on by the light emission control signal EM1*j* received through the light emission control line EML1*j* to transfer the first driving voltage ELVDD to the first electrode of the first transistor T1.

The sixth transistor T6 includes a first electrode connected to the second electrode of the first transistor T1, a second electrode connected to the anode of the light emitting diode ED, and a gate electrode connected to the light emission control line EML2*j*. The sixth transistor T6 may be turned on according to the light emission control signal EM2*j* received through the light emission control line EML2*j* to electrically connect the second electrode of the first transistor T1 to the light emitting diode ED.

The seventh transistor T7 includes a first electrode connected to the anode of the light emitting diode ED, a second electrode connected to the fourth voltage line VL4, and a gate electrode connected to the scan line EBLj. The seventh transistor T7 is turned on according to the scan signal EBj transferred through the scan line EBLj to bypass the current of the anode of the light emitting diode ED to the fourth voltage line VL4.

The capacitor Chold is connected between the first voltage line VL1 and the first node N1. The capacitor Cst is connected between the first node N1 and the gate electrode of the first transistor T1.

Figure 3A:
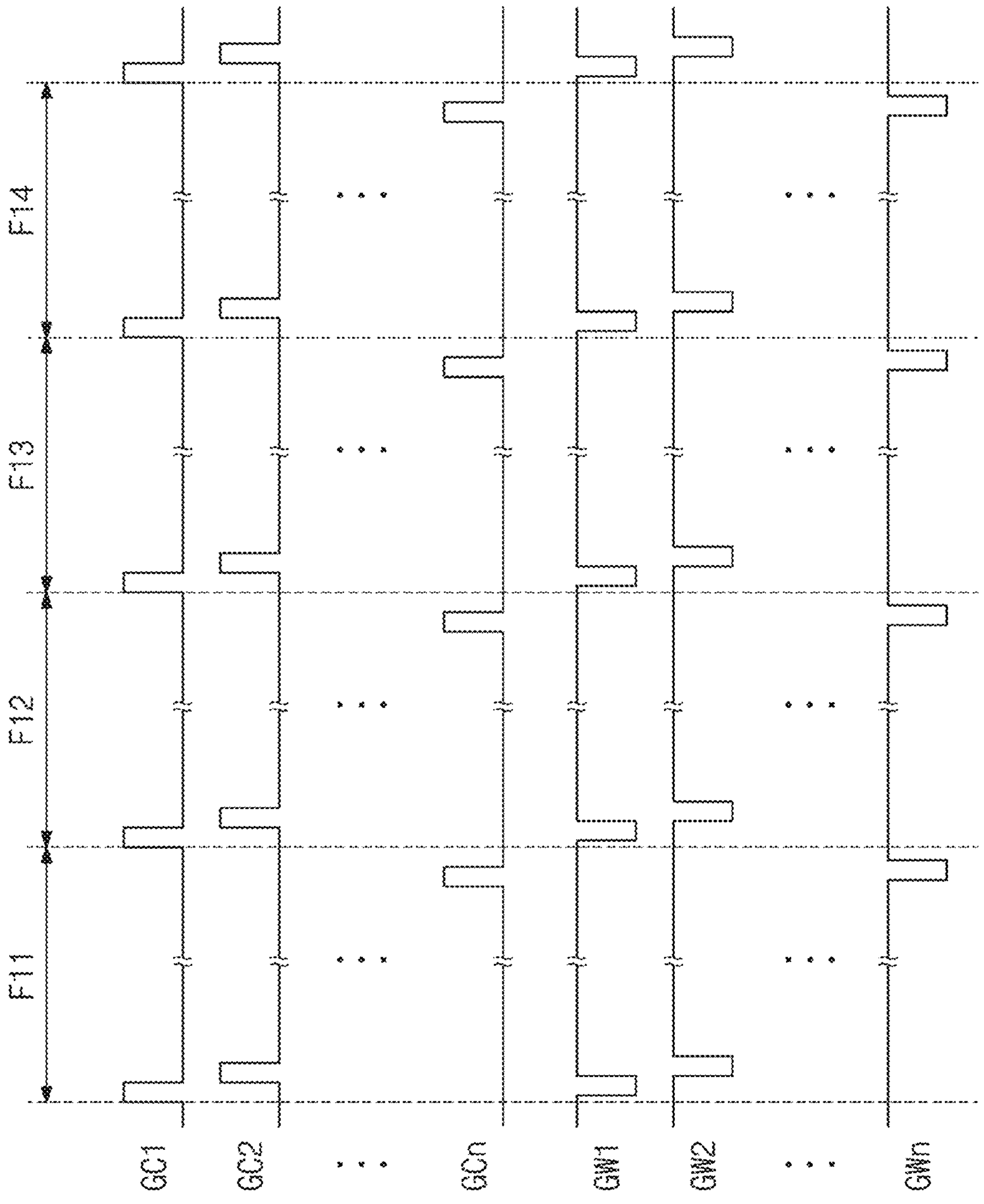
FIGS. 3A, 3B, and 3C are timing diagrams for explaining an operation of a display device.
Figure 3B:
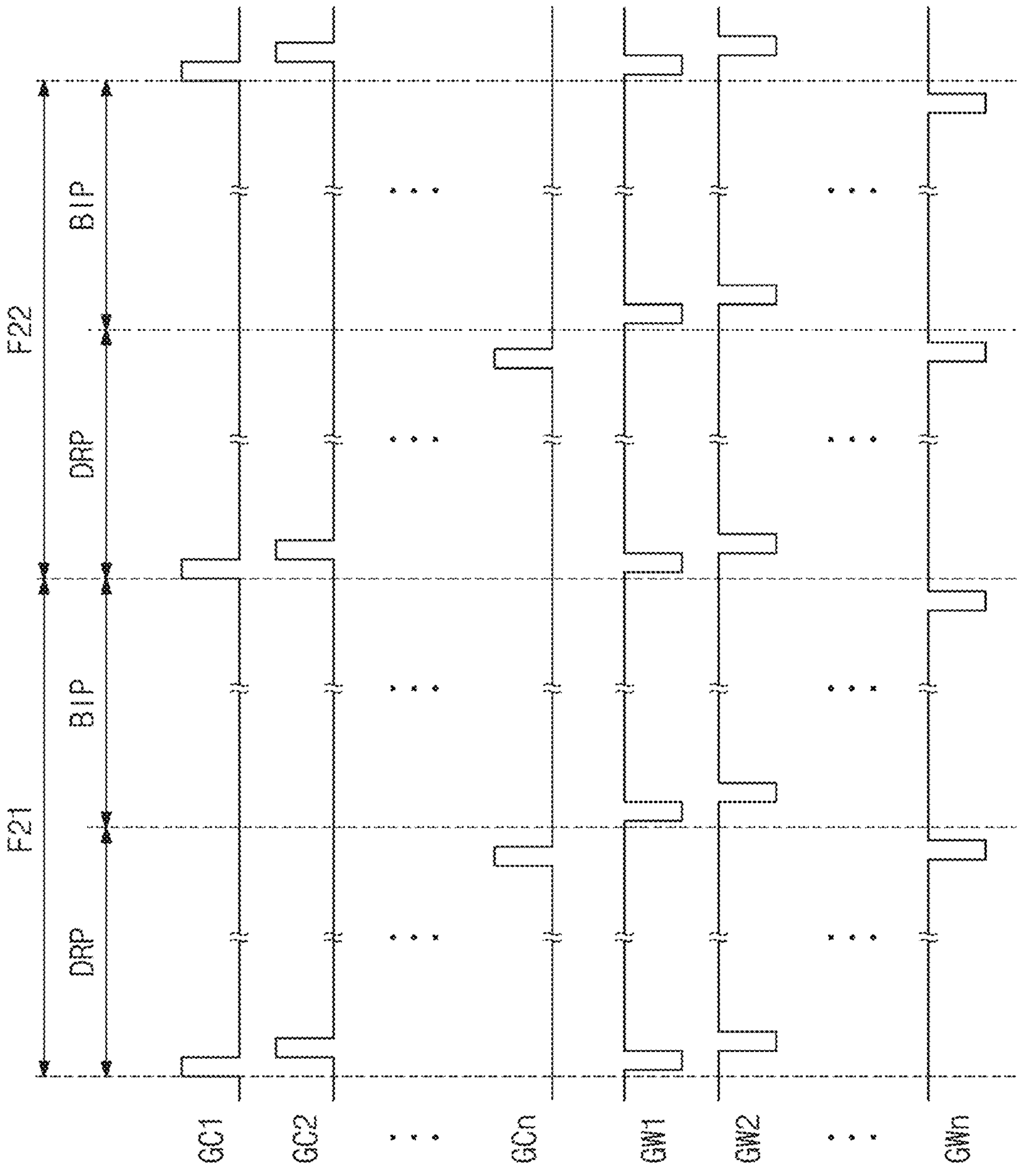
Figure 3C:
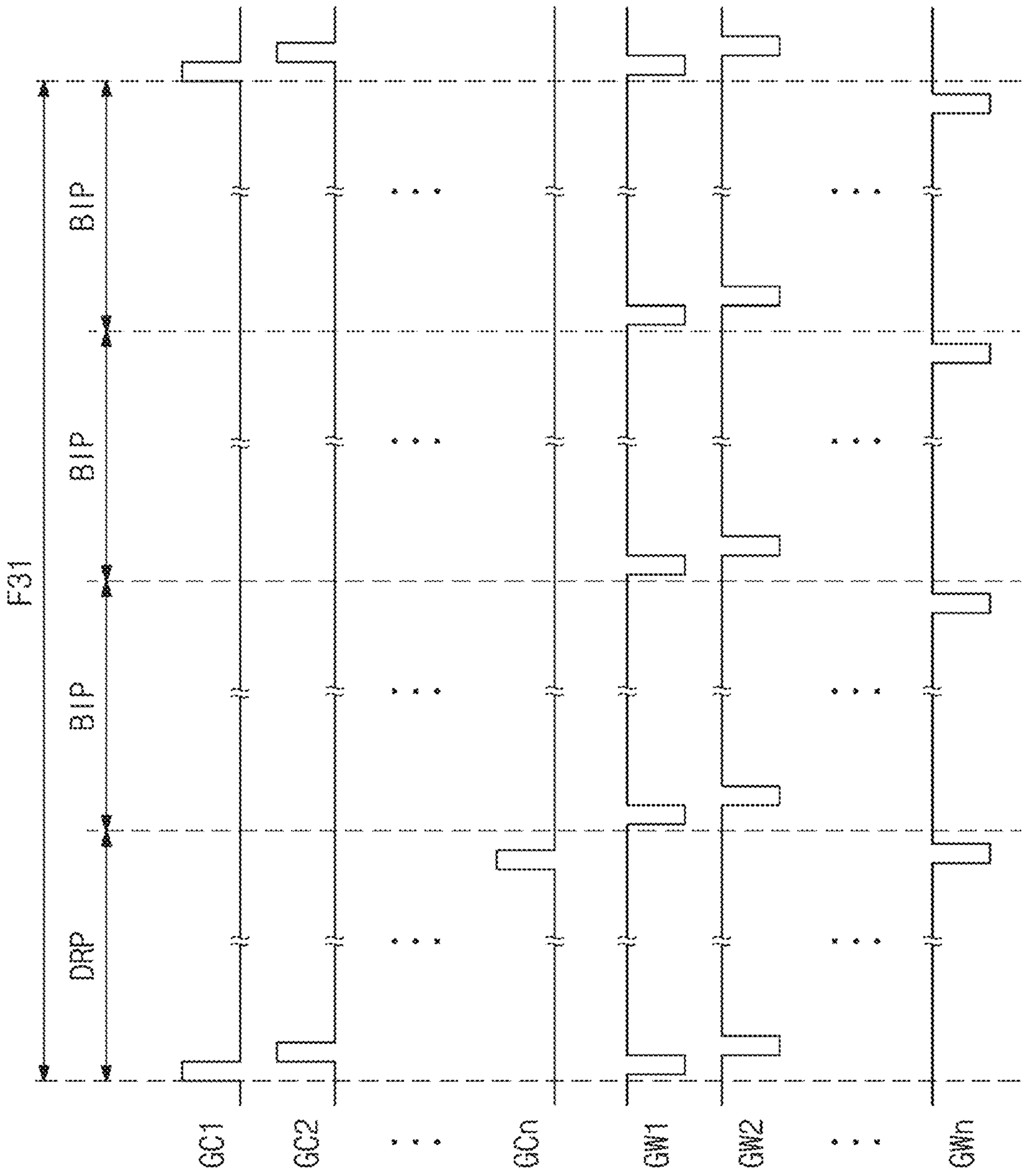

FIGS. 3A, 3B, and 3C are timing diagrams for explaining the operation of the display device.

Referring to FIGS. 1, 2, 3A, 3B and 3C, the driving frequency of the display device DD may be changed in various ways. For convenience of explanation, the display device DD is illustrated to operate at a first frequency (e.g., 240 Hertz (Hz)), a second frequency (e.g., 120 Hz), and a third frequency (e.g., 60 Hz), but the embodiment of the present invention is not limited thereto. In one embodiment, according to the type of the image signal RGB, the driving frequency of the display device DD may be selected from among the first frequency, the second frequency, and the third frequency. For example, when the image signal RGB is a moving image, the driving frequency of the display device DD may be selected as the first frequency. For example, when the image signal RGB is an image of which change period is long, the driving frequency of the display device DD may be selected as the second frequency. For example, when the image signal RGB is an image, such as a digital frame, that is not changed for a long time, the driving frequency of the display device DD may be selected as the third frequency.

The driving controller 100 provides the scan control signal SCS to the scan driving circuit SD. The scan control signal SCS may include information about the driving frequency of the display device DD. The scan driving circuit SD may output the scan signals GC1 to GCn and GW1 to GWn in response to the scan control signal SCS.

FIG. 3A is a timing diagram of the scan signals, when the driving frequency of the display device DD is the first frequency (e.g., 240 Hz).

Referring to FIGS. 1 and 3A, when the driving frequency is the first frequency (e.g., 240 Hz), the scan driving circuit SD sequentially activates the scan signals GC1 to GCn to a high level in each of frames F11, F12, F13, and F14, and sequentially activates the scan signals GW1 to GWn to a low level. In FIG. 3A, only the scan signals GC1 to GCn and GW1 to GWn are illustrated, but the scan signals GI1 to GIn and EB1 to EBn, and the light emission control signals EM11 to EM1*n* and EM21 to EM2*n* may also be sequentially activated in each of the frames F11, F12, F13, and F14.

FIG. 3B is a timing diagram of the scan signals, when the driving frequency of the display device DD is the second frequency (e.g., 120 Hz).

Referring to FIGS. 1 and 3B, when the driving frequency is the second frequency (e.g., 120 Hz), the duration of each of the frames F21 and F22 may be double that of each of the frames F11, F12, F13, and F14 shown in FIG. 3A. Each of the frames F21 and F22 may include one driving period DRP and one bias period BIP. The scan driving circuit SD may sequentially activate, in a preset sequence, the scan signals GI1 to GIn, the scan signals GC1 to GCn, the scan signals GW1 to GWn, the scan signals EB1 to EBn, and the light emission control signals EM11 to EM1*n* and EM21 to EM2*n* during the driving period DRP.

In FIG. 3B, only the scan signals GC1 to GCn and GW1 to GWn are illustrated, but the scan signals EB1 to EBn and the light emission control signals EM11 to EM1*n* and EM21 to EM2*n* may also be sequentially activated during the driving period DRP.

During the bias period BIP, the scan driving circuit SD maintains the scan signals GC1 to GCn in a deactivated state of a low level, and sequentially activates the scan signals GW1 to GWn to the low level.

Although not shown in the FIG. 3B, the scan driving circuit SD maintains the scan signals GI1 to GIn in a deactivated state of the low level, and sequentially activates, in a preset sequence, the scan signals EB1 to EBn and the light emission control signals EM11 to EM1*n* and EM21 to EM2*n* to the low level during the bias period BIP.

In an example shown in FIG. 3A, each of the frames F11, F12, F13, and F14 may correspond to the driving period DRP shown in FIG. 3B.

FIG. 3C is a timing diagram of the scan signals, when the driving frequency of the display device DD is the third frequency (e.g., 60 Hz).

Referring to FIGS. 1 and 3C, when the driving frequency is the third frequency (e.g., 60 Hz), the duration of the frame F31 may be double that of each of the frames F21 and F22 shown in FIG. 3B. The duration of the frame F31 may be four times that of each of the frames F11, F12, F13 and F14 shown in FIG. 3A.

The frames F31 may include one driving period DRP and three bias periods BIP. The scan driving circuit SD may sequentially activate, in a preset sequence, the scan signals GI1 to GIn, the scan signals GC1 to GCn, the scan signals GW1 to GWn, the scan signals EB1 to EBn, and the light emission control signals EM11 to EM1*n* and EM21 to EM2*n* during the driving period DRP.

In FIG. 3C, only the scan signals GC1 to GCn and the scan signals GW1 to GWn are illustrated, but the scan signals EB1 to EBn and the light emission control signals EM11 to EM1*n* and EM21 to EM2*n* may also be sequentially activated during the driving period DRP.

The scan driving circuit SD maintains the scan signals GI1 to GIn in a deactivated state of a low level in each of the three bias periods BIP, and sequentially activates, in a preset sequence, the scan signals EB1 to EBn and the light emission control signals EM11 to EM1*n* and EM21 to EM2*n* to the low level during the bias period BIP.

Although not shown in the FIG. 3C, the scan driving circuit SD maintains the scan signals GI1 to GIn in the deactivated state of the low level, and sequentially activates the scan signals EB1 to EBn and the light emission control signals EM11 to EM1*n* and EM21 to EM2*n* to the low level during the bias period BIP.

Figure 4:
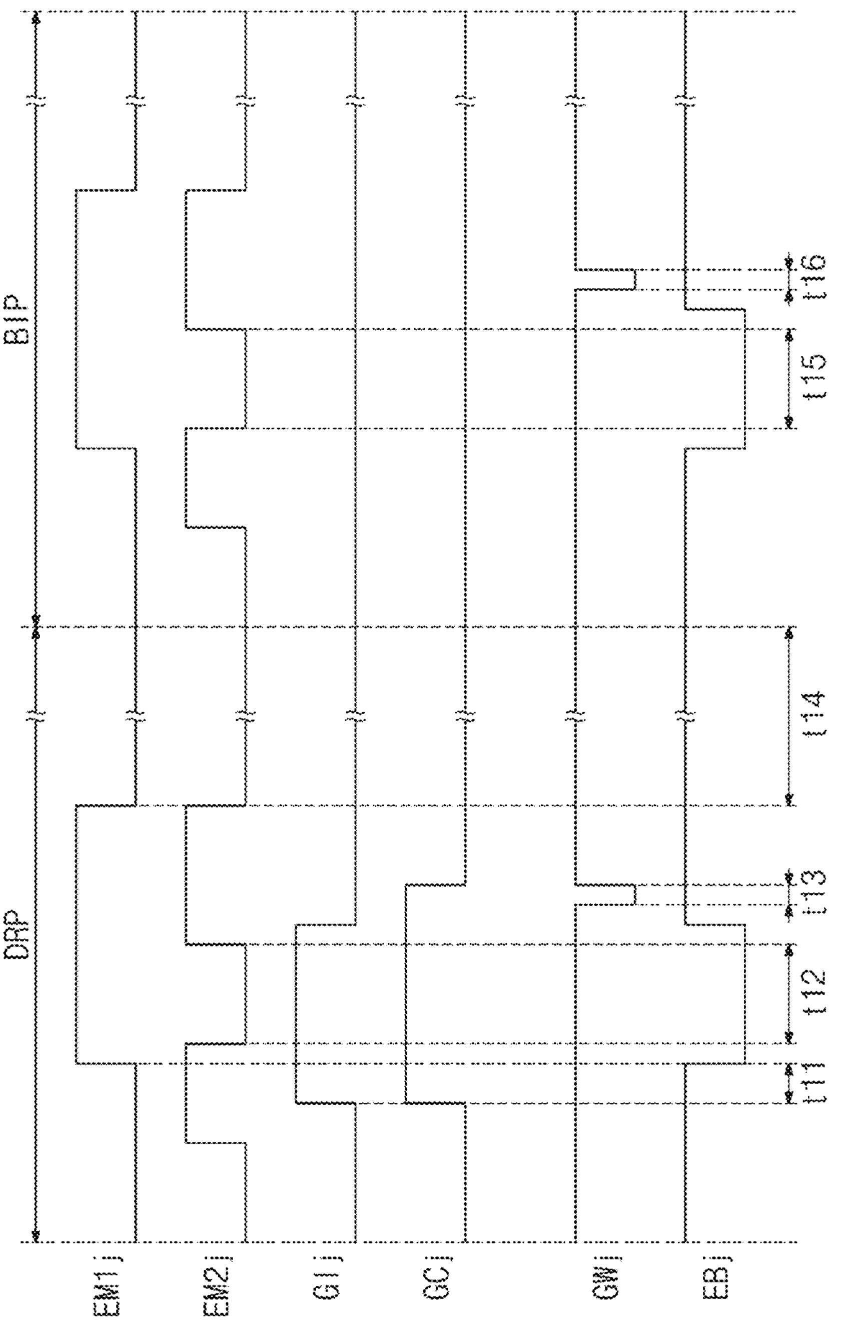
FIG. 4 is a timing diagram of scan signals and light emission control signals for explaining operations in the driving period and the bias period of pixel shown in FIG. 2.

FIG. 4 is a timing diagram of scan signals and light emission control signals for explaining operations in the driving period and the bias period of pixel shown in FIG. 2.

Referring to FIG. 4, the driving period DRP may include first to fourth periods t11 to t14, and the bias period BIP may include a fifth period t15 and a sixth period t16.

FIGS. 5A to 5F are diagrams for explaining operations in the first to sixth periods shown in FIG. 4 of the pixel shown in FIG. 2.

Figure 5A:
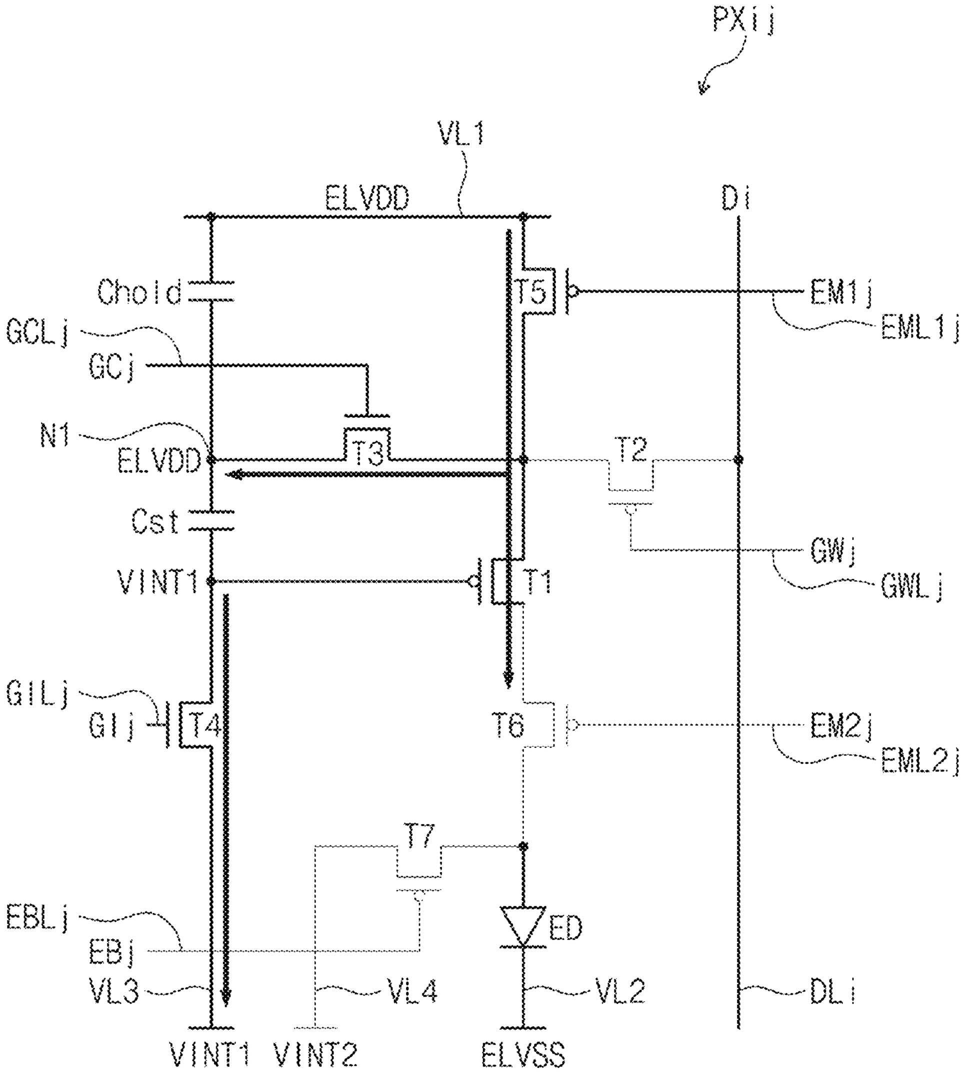
FIGS. 5A to 5F are diagrams for explaining respective operations in first to sixth periods shown in FIG. 4 of the pixel shown in FIG. 2.

Referring to FIGS. 4 and 5A, the third transistor T3 and the fourth transistor T4 are turned on in response to the scan signals GIj and GCj of a high level in the first period t11 of the driving period DRP, respectively. Since each of the scan signals GWj and EBj is at the high level in the first period t11, each of the second transistor T2 and the seventh transistor T7 is turned off. In addition, since the light emission control signal EMU is at a low level and the light emission control signal EM2*j* is at the high level in the first period t11, the fifth transistor T5 is turned on and the sixth transistor T6 is turned off.

Figure 5B:
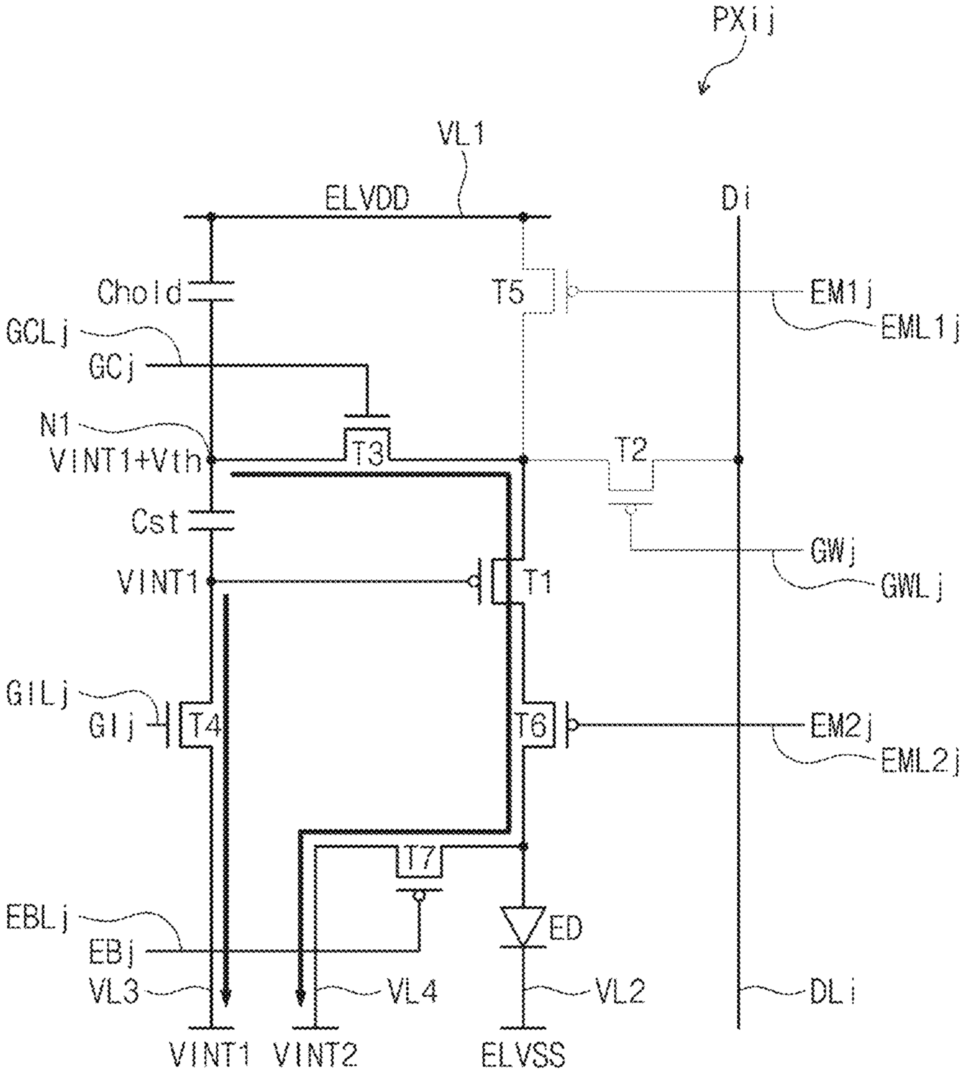

Therefore, the first initialization voltage VINT1 may be provided to the gate electrode of the first transistor T1 through the fourth transistor T4, and the first driving voltage ELVDD may be provided to the first node N1 through the fifth transistor T5 and the third transistor T3. The first period t11 may be an initialization period in which the gate electrode of the first transistor T1 is initialized. Referring to FIGS. 4 and 5B, each of the third transistor T3 and the fourth transistor T4 maintains the turn-on state in the second period t12 of the driving period DRP. In the second period t12, the second transistor T2 maintains the turn-off state, and, since the scan signal EBj is transitioned to the low level, the seventh transistor T7 is turned on. As the seventh transistor T7 is turned on, the current of the anode of the light emitting diode ED may be bypassed to the fourth voltage line VL4.

In addition, since the light emission control signal EM1*j* is at a high level and the light emission control signal EM2*j* is at a low level in the second period t12, the fifth transistor T5 is turned off and the sixth transistor T6 is turned on.

As the first transistor T1 operates as a source follower in a state of the third transistor T3 being turned on, a voltage VINT+Vth may be provided to the first node N1, where the voltage VINT+Vth is a voltage higher than the first initialization voltage VINT1 by a threshold voltage (referred to as Vth) of the first transistor T1. In other words, a voltage difference between opposite ends of the capacitor Cst is equal to the threshold voltage Vth of the first transistor T1. The second period t12 may be a bypass and compensation period in which the current of the anode of the light emitting diode ED is bypassed, and the threshold voltage Vth of the first transistor T1 is compensated. In an embodiment, the first period t11 and the second period t12 may be integrally referred to as an initialization period.

Figure 5C:
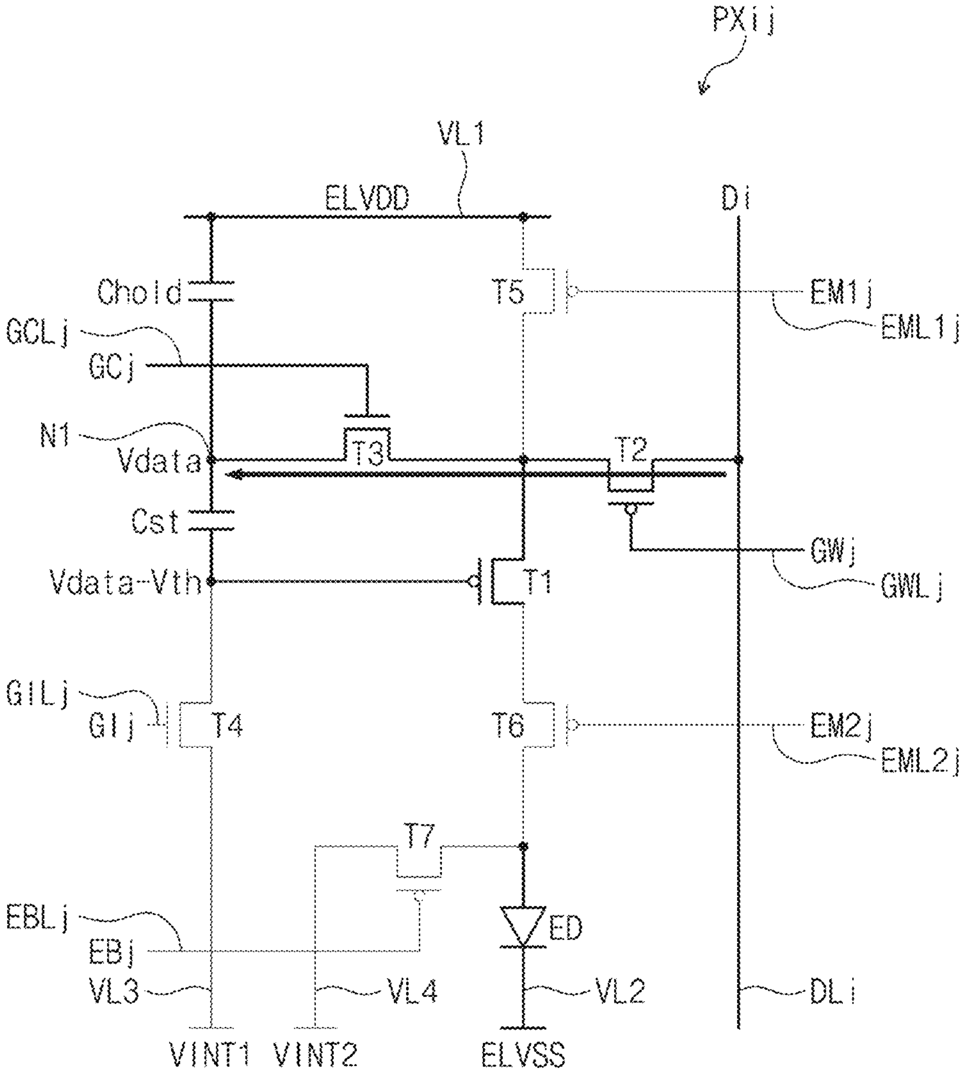

Referring to FIGS. 4 and 5C, as the scan signal GIj is transitioned to a low level in the third period t13 of the driving period DRP, the fourth transistor T4 is turned off. Since each of the light emission control signals EM1*j* and EM2*j* is at an inactive high level, the fifth transistor T5 and the sixth transistor T6 are turned off.

In the third period t13, since the scan signal GWj is transitioned to a low level, the second transistor T2 is turned on and the third transistor T3 maintains the turn-on state. Therefore, the data signal Di provided through the data line DLi may be provided to the first node N1. The voltage at one end of the capacitor Cst, namely, the first node N1, is changed to a voltage level Vdata of the data signal Di, and the voltage of the gate electrode of the first transistor T1, namely, the other end of the capacitor Cst may be changed to Vdata-Vth. Here, Vdata-Vth is a voltage lower than the voltage level Vdata of the data signal Di by a threshold voltage (referred to as Vth) of the first transistor T1. The third period t13 may be a write period in which the voltage level Vdata corresponding to the data signal Di is provided to the one end of the capacitor Cst.

Figure 5D:
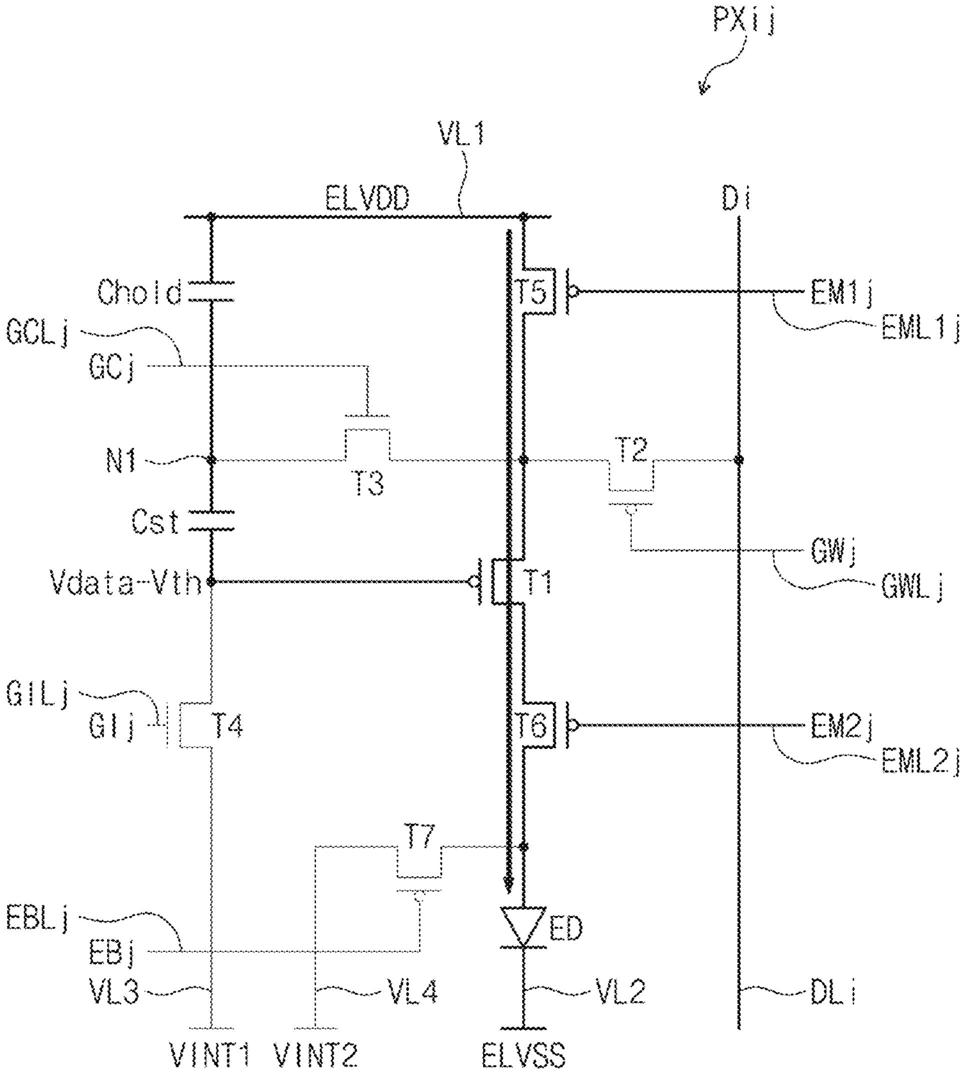

Referring to FIGS. 4 and 5D, all the scan signals GIj, GCj, GWj, and EBj may be transitioned to an inactive level in the fourth period t14 of the driving period DRP. Therefore, the second, third, fourth, and seventh transistors T2, T3, T4, and T7 are turned off. Since each of the light emission control signals EM1*j* and EM2*j* is at an active low level in the fourth period t14, the fifth transistor T5 and the sixth transistor T6 are turned on. As the fifth transistor T5 and the sixth transistor T6 are turned on, a current path may be formed from the first voltage line VL1 to the light emitting diode ED via the fifth transistor T5, the first transistor T1, and the sixth transistor T6.

The current flowing through the light emitting diode ED is proportional to $(Vgs-Vth)^2$ that is the square of the difference between the gate-source voltage (referred to as Vgs) of the first transistor T1 and the threshold voltage Vth of the first transistor T1. Since the voltage level of the gate electrode of the first transistor T1 is Vdata−Vth, the current flowing through the light emitting diode ED becomes proportional to $(ELVDD-Vdata)^2$ that is the square of the difference between the first driving voltage ELVDD and the voltage level Vdata corresponding to the data signal Di. In other words, the threshold voltage Vth of the first transistor T1 may not influence the current flowing through the light emitting diode ED. The fourth period t14 may be a light emission period of the light emitting diode ED.

Figure 5E:
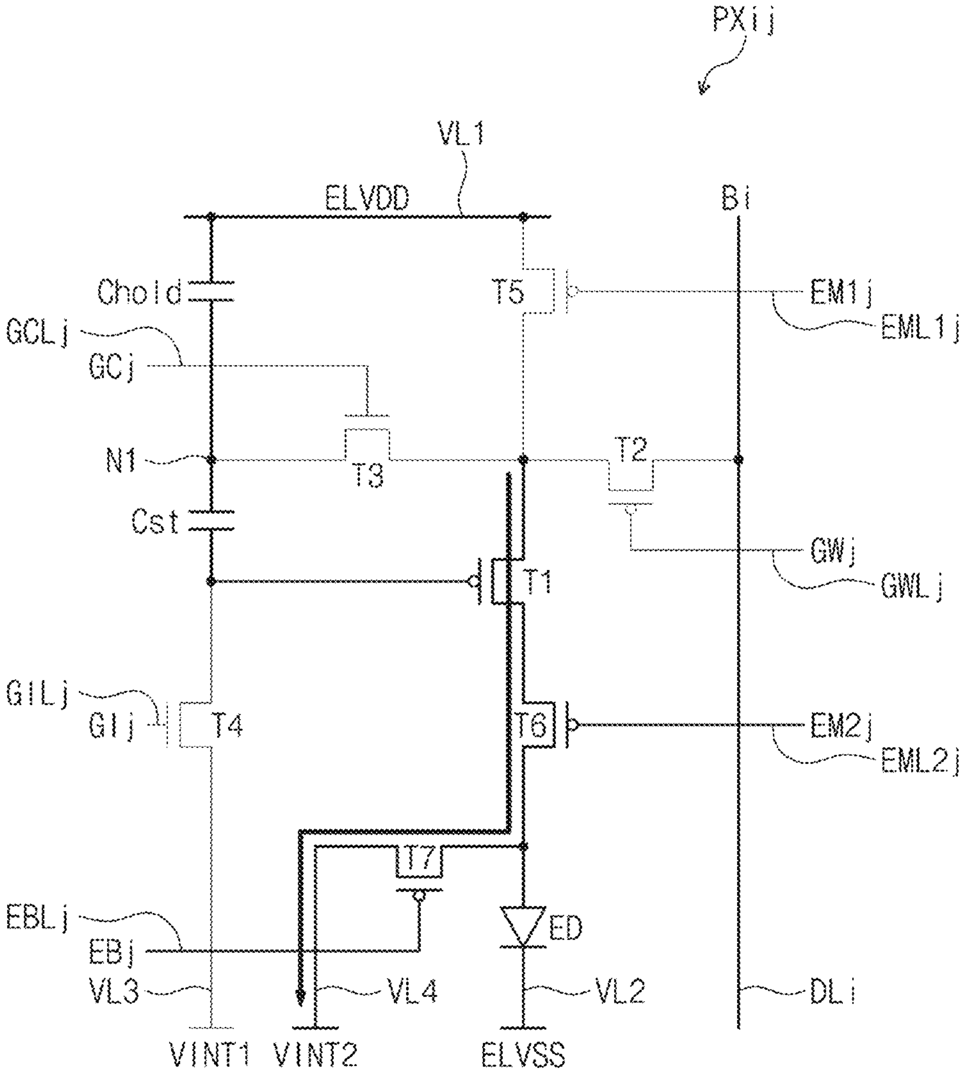

Referring to FIGS. 4 and 5E, the scan signals GIj and GCj are maintained to an inactive low level. Therefore, the third transistor T3 and the fourth transistor T4 are maintained in the turn-off state. In the fifth period t15 of the bias period BIP, the light emission control signal EM1*j* is at inactive high level, the fifth transistor T5 is turned off. In addition, in the fifth period t15, since each of the light emission control signal EM2*j* and the scan signal EBj is transitioned to a low level, the sixth transistor T6 and the seventh transistor T7 are turned on. Accordingly, the current of the anode of the light emitting diode ED may be bypassed to the fourth voltage line VL4 through the seventh transistor T7. The fifth period t15 may be a bypass period in which the current of the anode of the light emitting diode ED is bypassed.

Figure 5F:
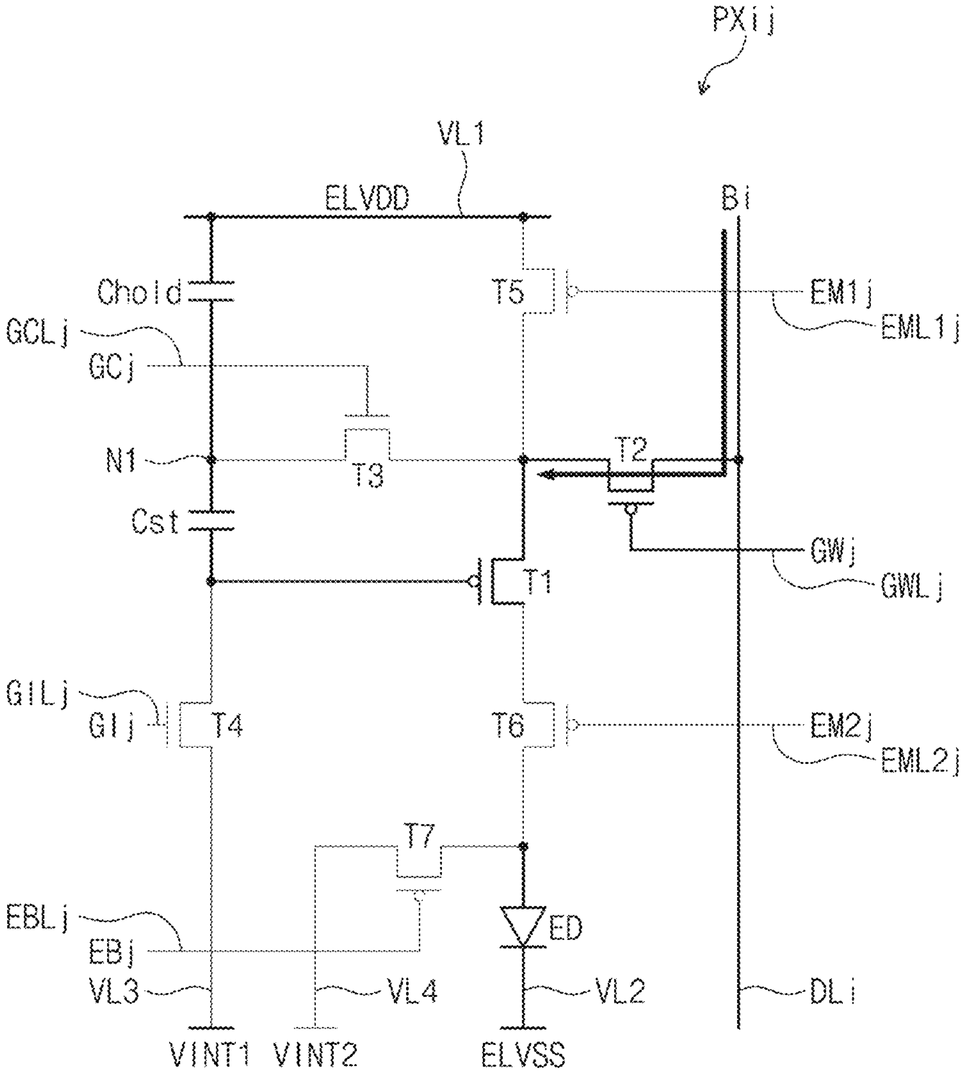

Referring to FIGS. 4 and 5F, since the light emission control signals EM1*j* and EM2*j* and the scan signal EBj are at high levels in a sixth period t16 of the bias period BIP, respectively, the fifth transistor T5, the sixth transistor T6, and the seventh transistor T7 are turned off. When the scan signal GWj is transitioned to a low level in the sixth period t16, the second transistor T2 may be turned on and a bias signal Bi provided through the data line DLi may be provided to the first electrode of the first transistor T1. The bias signal Bi provided through the data line DLi in the sixth period t16 of the bias period BIP may have a prescribed voltage level (e.g., a voltage level between 3 to 7 voltages (V)).

According to the hysteresis characteristics of the first transistor T1, a driving current of the first transistor T1 due to the data signal Di applied in the driving period DRP of the current frame may be influenced by the data signal Di applied in the driving period DRP of the previous frame.

In particular, as described with reference to FIGS. 3A and 3B, in a variable frequency mode in which the driving frequency of the display device DD is frequently changed from the first frequency to the second frequency (or the third frequency) and is changed again from the second frequency (or the third frequency) to the first frequency, a user may sense a change in brightness according to the hysteresis characteristics.

As the bias signal Bi is provided to the first electrode of the first transistor T1 in the sixth period t16 of the bias period BIP, the brightness change caused by the hysteresis characteristics of the first transistor T1 may be effectively minimized. The sixth period t16 may be an on-bias period in which the bias signal Bi is provided to the first electrode of the first transistor T1.

During the bias period BIP, the scan signals GIj and GCj for controlling the third and fourth transistors T3 and T4, which influence the voltage level of the gate electrode of the first transistor T1, are maintained at the low level of an inactive state. In addition, during the bias period BIP, the scan signals GWj and EBj for controlling the second and seventh transistors T2 and T7 may be activated to initialize the source electrode of the first transistor T1 and the anode of the light emitting diode ED. In this way, the bias period BIP, in which some of the scan signals GIj, GCj, GWj, and EBj are activated to initialize the source electrode of the first transistor T1 and the anode of the light emitting diode ED, may be referred to as a self-scan period.

Figure 6:
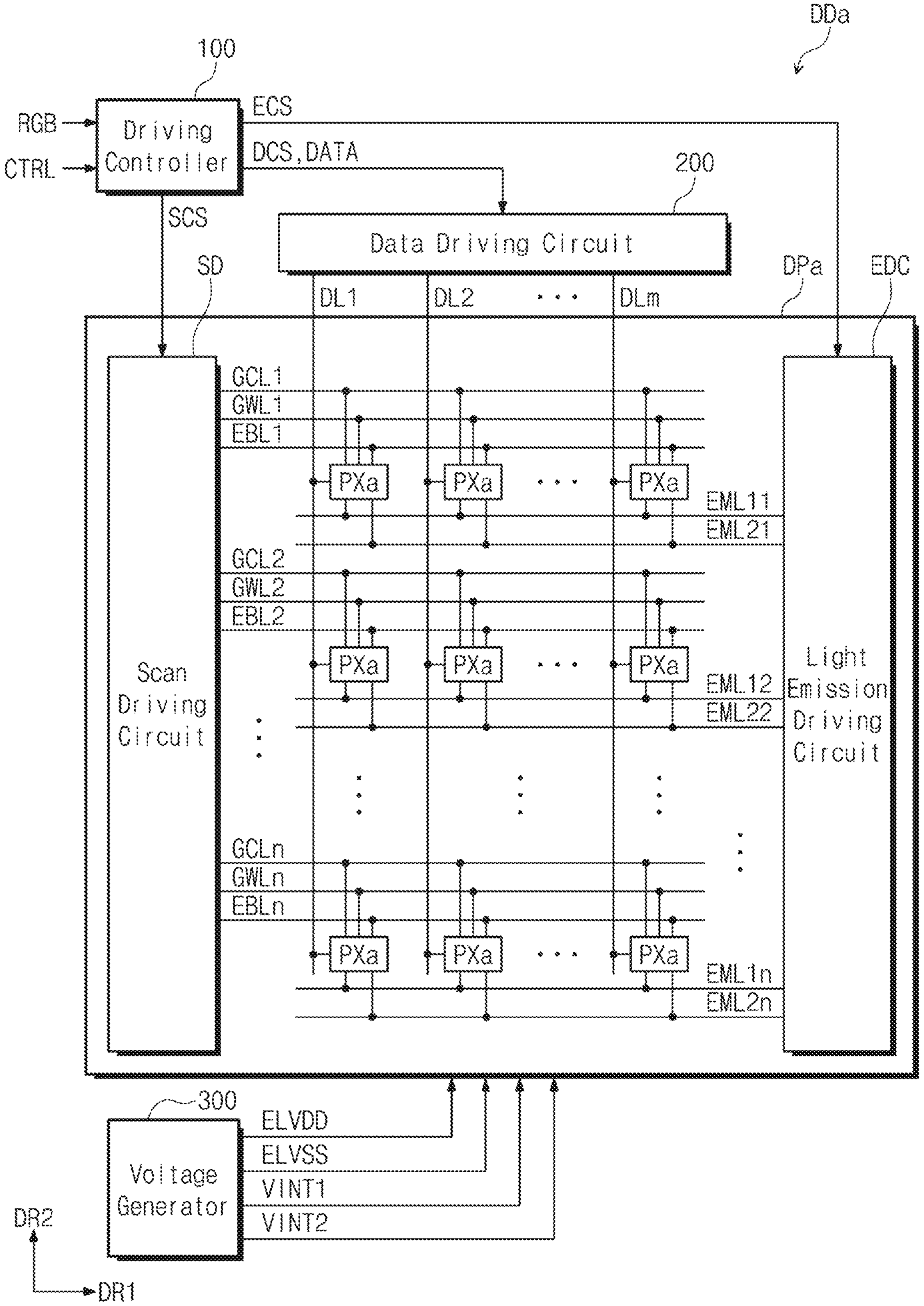
FIG. 6 is a block diagram of a display device according to another embodiment of the present invention.

FIG. 6 is a block diagram of a display device according to another embodiment of the present invention.

The display device shown in FIG. 6 is partially similar to the display device DD shown in FIG. 1. The same components in the display device DDa in FIG. 6 as those in the display device DD in FIG. 1 have the same reference numerals and the repetitive descriptions will be omitted.

The display panel DPa includes scan lines GCL1 to GCLn, GWL1 to GWLn, and EBL1 to EBLn, light emission control lines EML11 to EML1*n* and EML21 to EML2*n*, data lines DL1 to DLm, and pixels PXa.

The display panel DP of the display device DD shown in FIG. 1 includes the scan lines GIL1 to GILn, but the display panel DPa of the display device DDa shown in FIG. 6 does not include the scan lines GIL1 to GILn.

Figure 7:
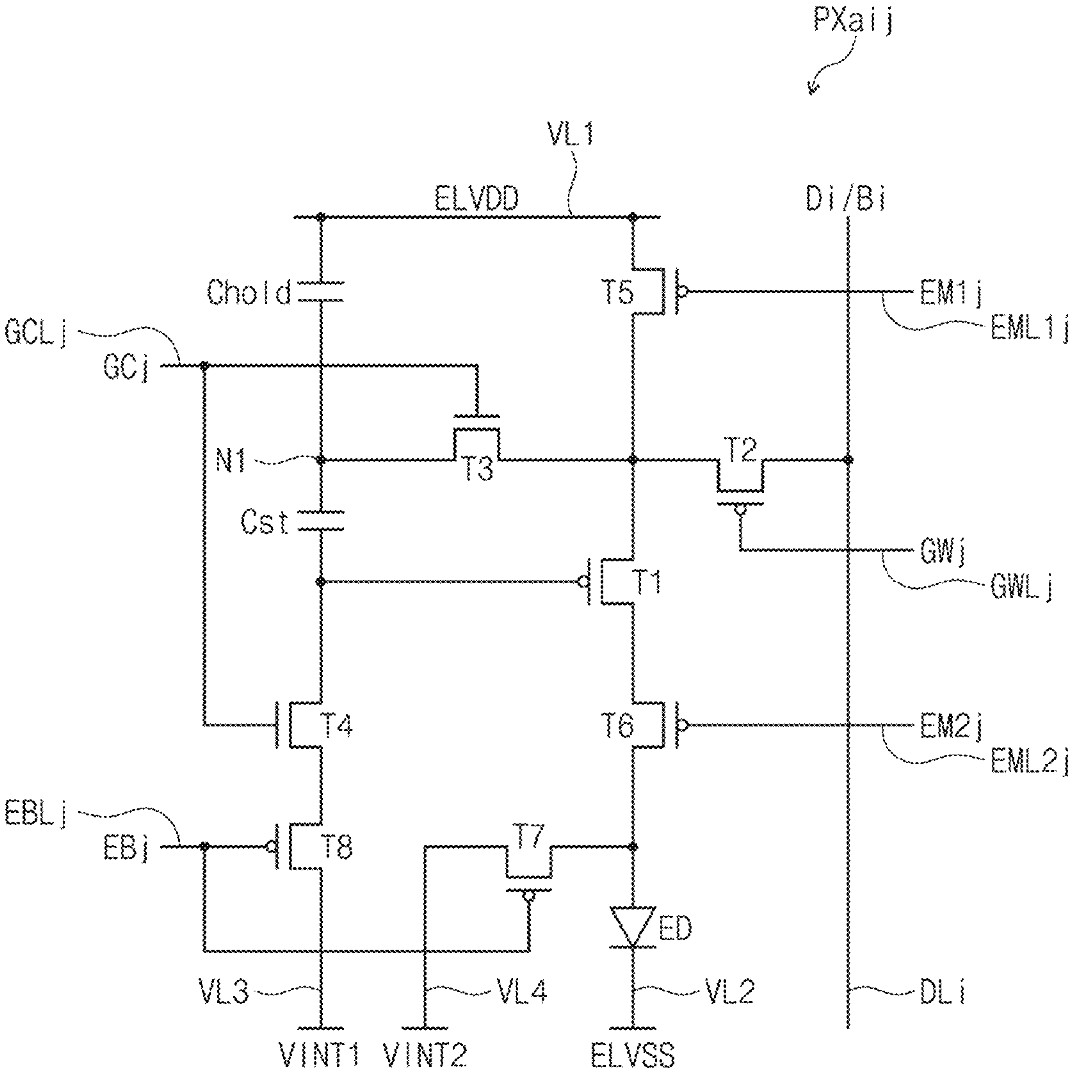
FIG. 7 is an equivalent circuit diagram of a pixel according to another embodiment of the present invention.

FIG. 7 is an equivalent circuit diagram of a pixel according to another embodiment of the present invention.

FIG. 7 illustrates the equivalent circuit diagram of the pixel PXaij connected to an i-th data line DLi among the data lines DL1 to DLm shown in FIG. 6, j-th scan lines GCLj, GWLj and EBLj among the scan lines GCL1 to GCLn, GWL1 to GWLn, and EBL1 to EBLn, and a j-th light emission control lines EML1*j* and EML2*j* among the light emission control lines EML11 to EML1*n* and EML21 to EML2*n*.

Each of the plurality of pixels PXa shown in FIG. 6 may have the same circuit configuration as the equivalent circuit diagram of the pixel PXaij shown in FIG. 7.

Referring to FIG. 7, the pixel PXaij of the display device according to an embodiment includes first to eighth transistors T1, T2, T3, T4, T5, T6, T7, and T8, capacitors Cst and Chold, and at least one light emitting diode ED.

In this embodiment, each of the first, second, fifth, sixth, seventh, and eighth transistors T1, T2, T5, T6, T7, and T8 among the first to eighth transistors T1 to T8 may be a P-type transistor having an LTPS semiconductor layer, and the third and fourth transistors T3 and T4 may be N-type transistors having an oxide semiconductor as a semiconductor layer. In another embodiment, the entirety of the first to eighth transistors T1 to T8 may be P-type transistors, or N-type transistors. In still another embodiment, at least one of the first to eighth transistors T1 to T8 may be a P-type transistor and the remaining transistors may be N-type transistors.

In addition, the circuit configuration of the pixel PXaij according to an embodiment of the present invention is not limited to FIG. 7. The pixel PXaij shown in FIG. 7 is merely exemplary, and the circuit configuration of the pixel PXaij may be modified and practiced.

The first, second, third, fifth, sixth, and seventh transistors T1, T2, T3, T5, T6 and T7 and capacitors Cst and Chold of the pixel PXaij shown in FIG. 7 are the same as those shown in FIG. 2, and thus, the same reference numerals are given and the repetitive descriptions will be omitted.

The fourth transistor T4 includes a first electrode connected to the gate electrode of the first transistor T1, a second electrode, and a gate electrode connected to the scan line GCLj. The scan line GCLj may be commonly connected to the gate electrode of the third transistor T3 and the gate electrode of the fourth transistor T4.

The eighth transistor T8 includes a first electrode connected to the second electrode of the fourth transistor T4, a second electrode connected to the third voltage line VL3, and a gate electrode connected to the scan line EBLj. The scan line EBLj may be commonly connected to the gate electrode of the seventh transistor T7 and the gate electrode of the eighth transistor T8.

Figure 8:
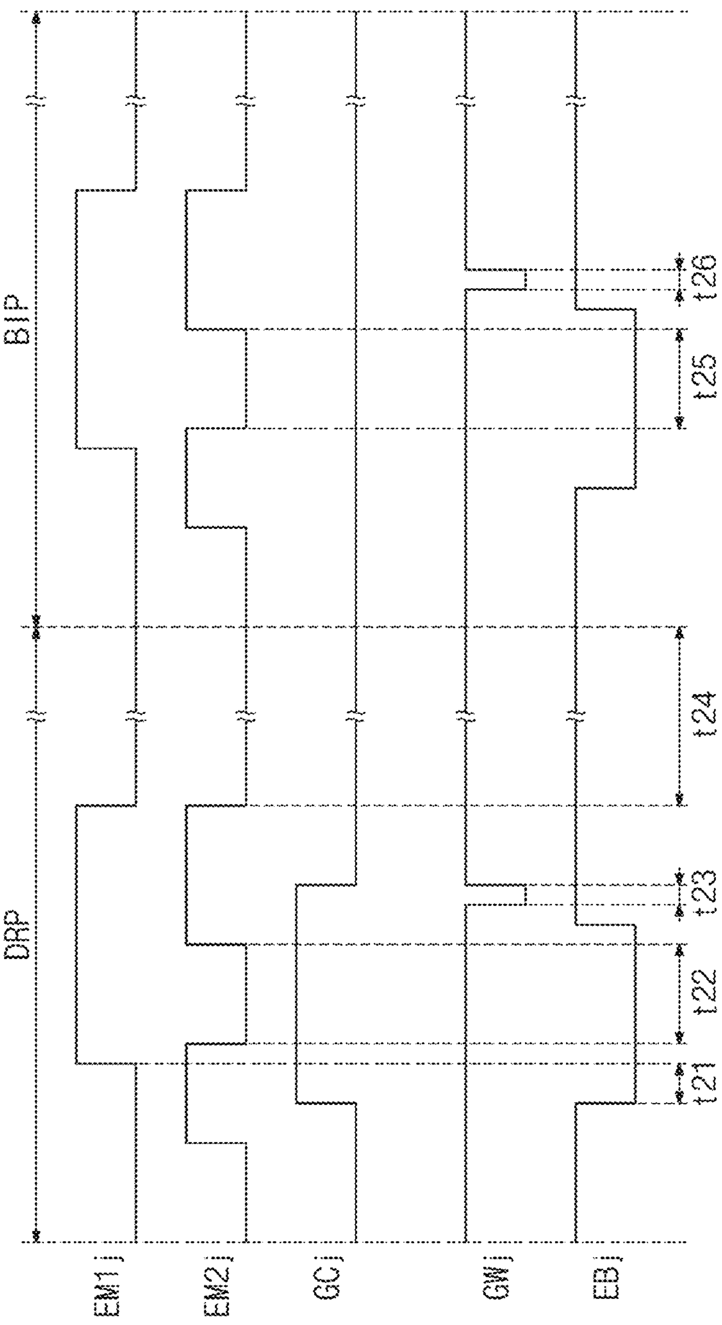
FIG. 8 is a timing diagram of the scan signals and the light emission control signals for explaining operations in the driving period and the bias period of pixel shown in FIG. 7.

FIG. 8 is a timing diagram of the scan signals and the light emission control signals for explaining operations in the driving period and the bias period of the pixel shown in FIG. 7.

Referring to FIG. 8, the driving period DRP may include first to fourth periods t21 to t24, and the bias period BIP may include a fifth period t25 and a sixth period t26.

FIGS. 9A to 9F are diagrams for explaining operations in the first to sixth periods shown in FIG. 8 of the pixel shown in FIG. 7.

Figure 9A:
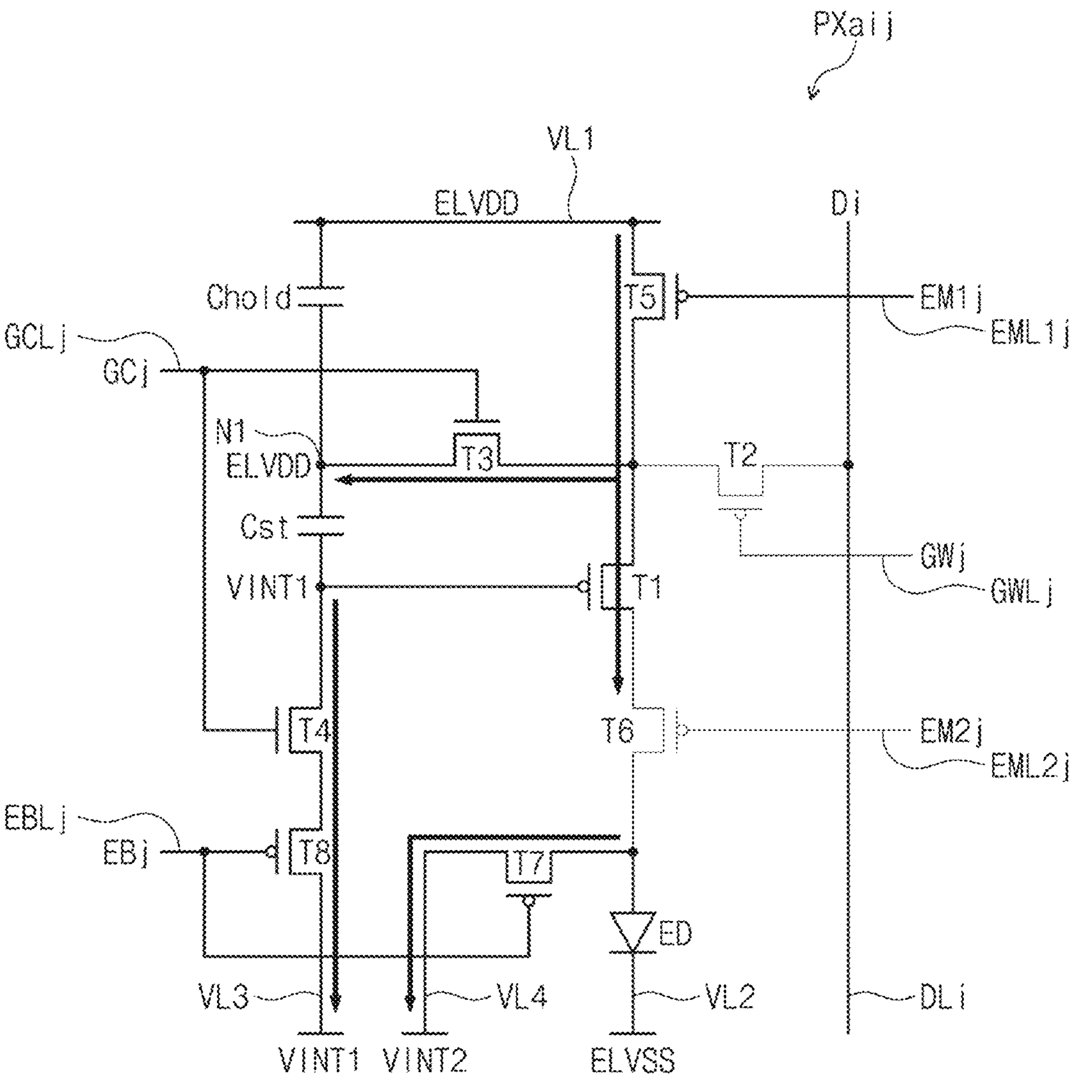
FIGS. 9A to 9F are diagrams for explaining operations in the first to sixth periods shown in FIG. 8 of the pixel shown in FIG. 7.

Referring to FIGS. 8 and 9A, each of the third transistor T3 and the fourth transistor T4 is turned on in response to the scan signal GCj of a high level in the first period t21 of the driving period DRP. Each of the seventh transistor T7 and the eighth transistor T8 is turned on in response to the scan signal EBj of a low level in the first period t21.

The scan signal GWj in the first period t21 is at the high level, and thus the second transistor T2 is turned off. In addition, since the light emission control signal EM1*j* is at the low level and the light emission control signal EM2*j* is at the high level in the first period t21, the fifth transistor T5 is turned on and the sixth transistor T6 is turned off.

Therefore, the first initialization voltage VINT1 may be provided to the gate electrode of the first transistor T1 through the eighth transistor T8 and the fourth transistor T4, and the first driving voltage ELVDD may be provided to the first node N1 through the fifth transistor T5 and the third transistor T3. The first period t21 may be an initialization period in which the gate electrode of the first transistor T1 is initialized.

Figure 9B:
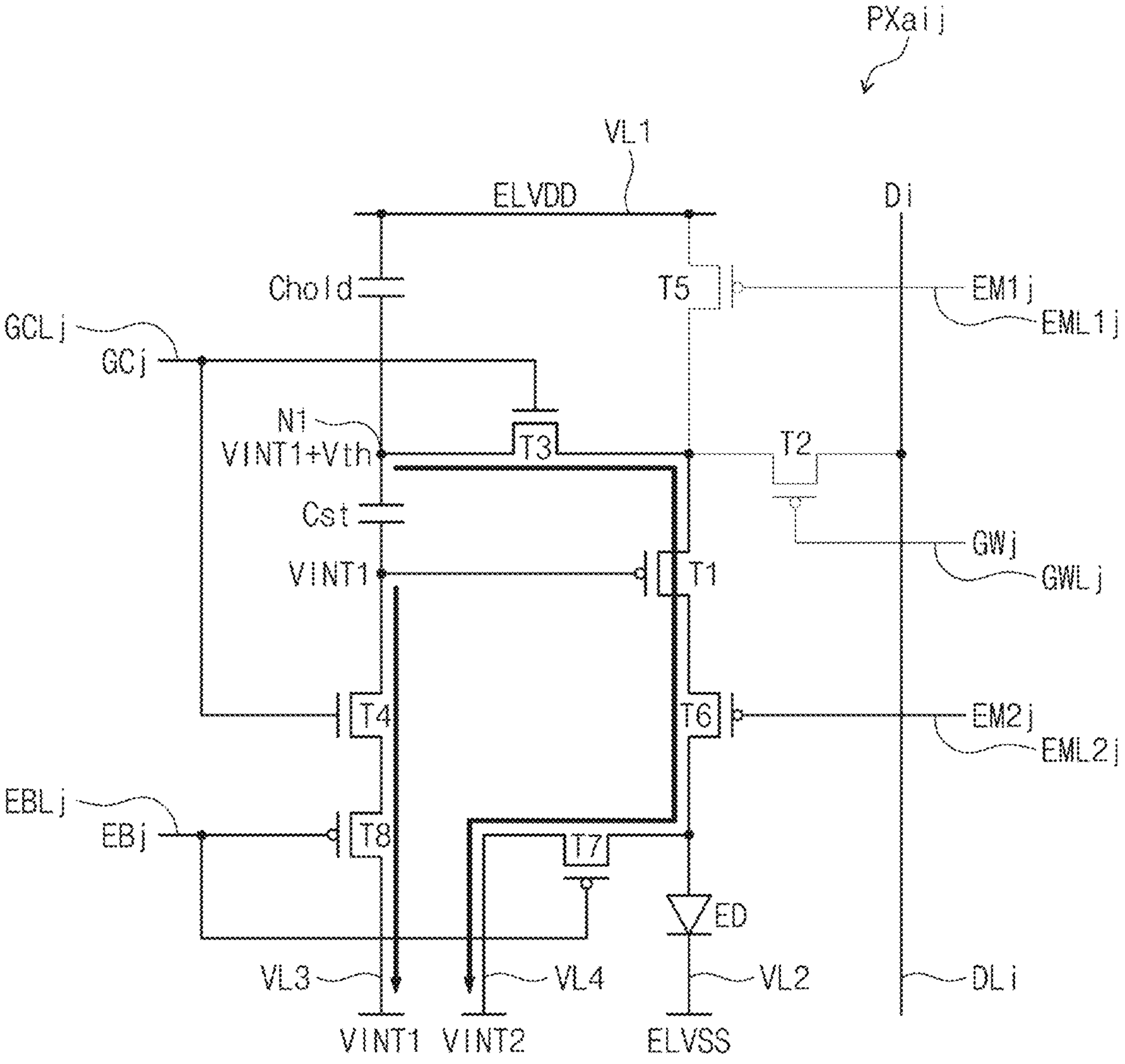

Referring to FIGS. 8 and 9B, each of the third transistor T3, the fourth transistor T4, the seventh transistor T7, and the eighth transistor T8 maintains the turn-on state in the second period t22 of the driving period DRP. In the second period t22, the second transistor T2 maintains the turn-off state, and, since the scan signal EBj is maintained as a low level, the seventh transistor T7 is maintained as the turned-on state. As the seventh transistor T7 is turned on, the current of the anode of the light emitting diode ED may be bypassed to the fourth voltage line VL4.

In addition, since the light emission control signal EM1*j* is at a high level and the light emission control signal EM2*j* is at the low level in the second period t22, the fifth transistor T5 is turned off and the sixth transistor T6 is turned on.

As the first transistor T1 operates as a source follower in a state of the third transistor T3 being turned on, a voltage VINT1+Vth may be provided to the first node N1, where the voltage VINT1+Vth is a voltage higher than the first initialization voltage VINT1 by a threshold voltage (referred to as Vth) of the first transistor T1. In other words, a voltage difference between opposite ends of the capacitor Cst is equal to the threshold voltage Vth of the first transistor T1. The second period t22 may be a bypass and compensation period in which the current of the anode of the light emitting diode ED is bypassed, and the threshold voltage Vth of the first transistor T1 is compensated. In an embodiment, the first period t21 and the second period t22 may be integrally referred to as an initialization period.

Figure 9C:
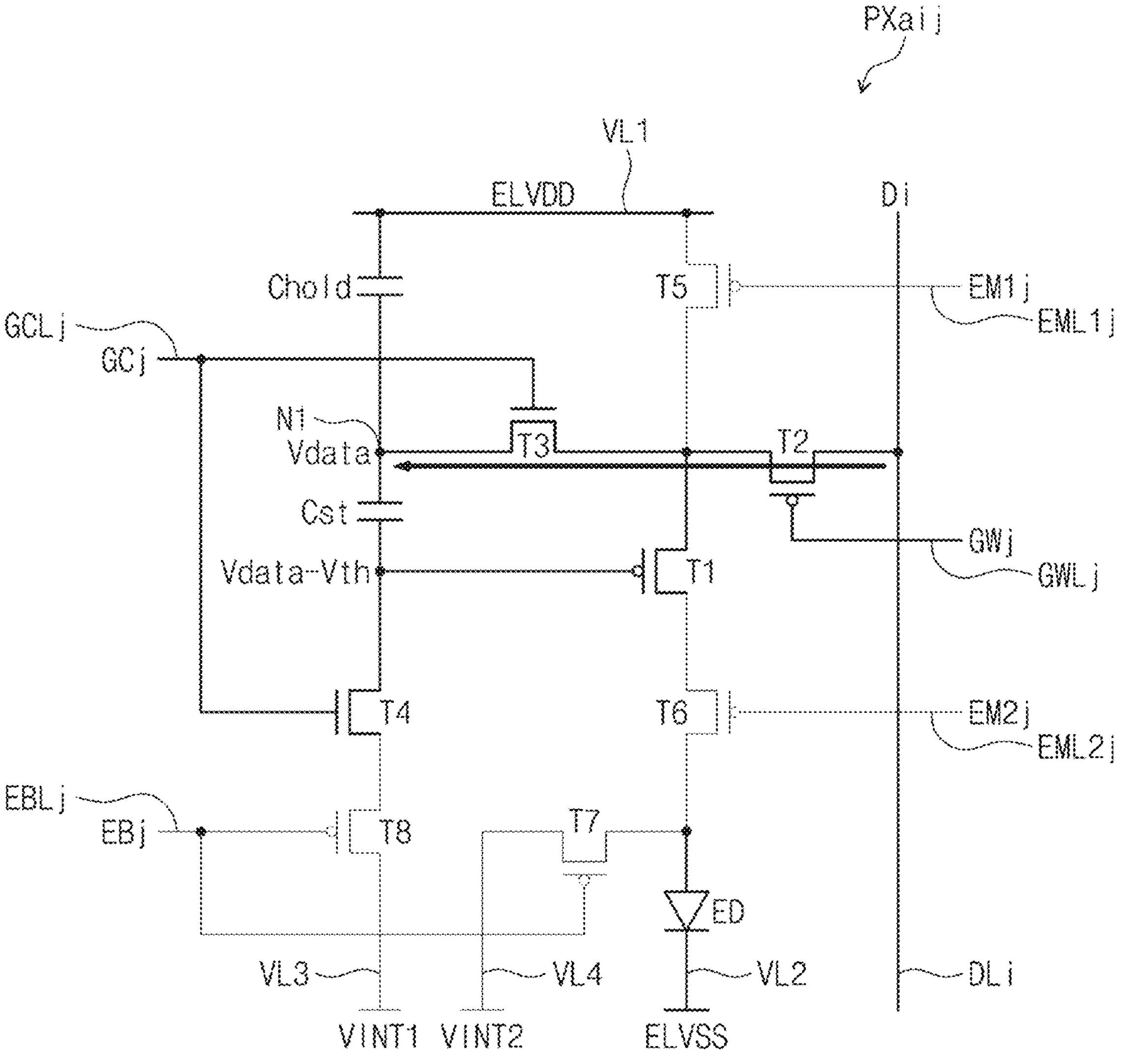

Referring to FIGS. 8 and 9C, as the scan signal GCj is maintained at a high level in the third period t23 of the driving period DRP, each of the third transistor T3 and the fourth transistor T4 maintains the turn-on state. Since each of the light emission control signals EM1*j* and EM2*j* and the scan signal EBj is at an inactive high level in the third period t23, each of the fifth transistor T5, the sixth transistor T6, the seventh transistor T7 and the eighth transistor T8 is turned off.

The scan signal GWj is transitioned to the low level, and thus the second transistor T2 is turned on. Therefore, the data signal Di provided through the data line DLi may be provided to the first node N1. A voltage level at one end of the capacitor Cst, namely, the first node N1, is changed to a voltage level Vdata corresponding to the data signal Di, and the voltage of the gate electrode of the first transistor T1, namely, the other end of the capacitor Cst may be changed to Vdata−Vth. The third period t23 may be a write period in which the voltage level Vdata corresponding to the data signal Di is provided to the one end of the capacitor Cst.

Even when the fourth transistor T4 maintains the turn-on state in the third period t23, the first initialization voltage VINT1 is not provided to the gate electrode of the first transistor T1 since the eighth transistor T8 is in a turn-off state.

The pixel PXaij shown in FIG. 7 further includes the eighth transistor T8 in comparison to the pixel PXij shown in FIG. 2. However, as the gate electrode of the eighth transistor T8 of the pixel PXaij commonly receives the scan signal EBj provided to the gate electrode of the seventh transistor T7, and the gate electrode of the fourth transistor T4 commonly receives the scan signal GCj provided to the gate electrode of the third transistor T3, the display panel DPa shown in FIG. 6 does not include the scan line GILj for delivering the scan signal GIj, unlike the display panel DP shown in FIG. 1.

Figure 9D:
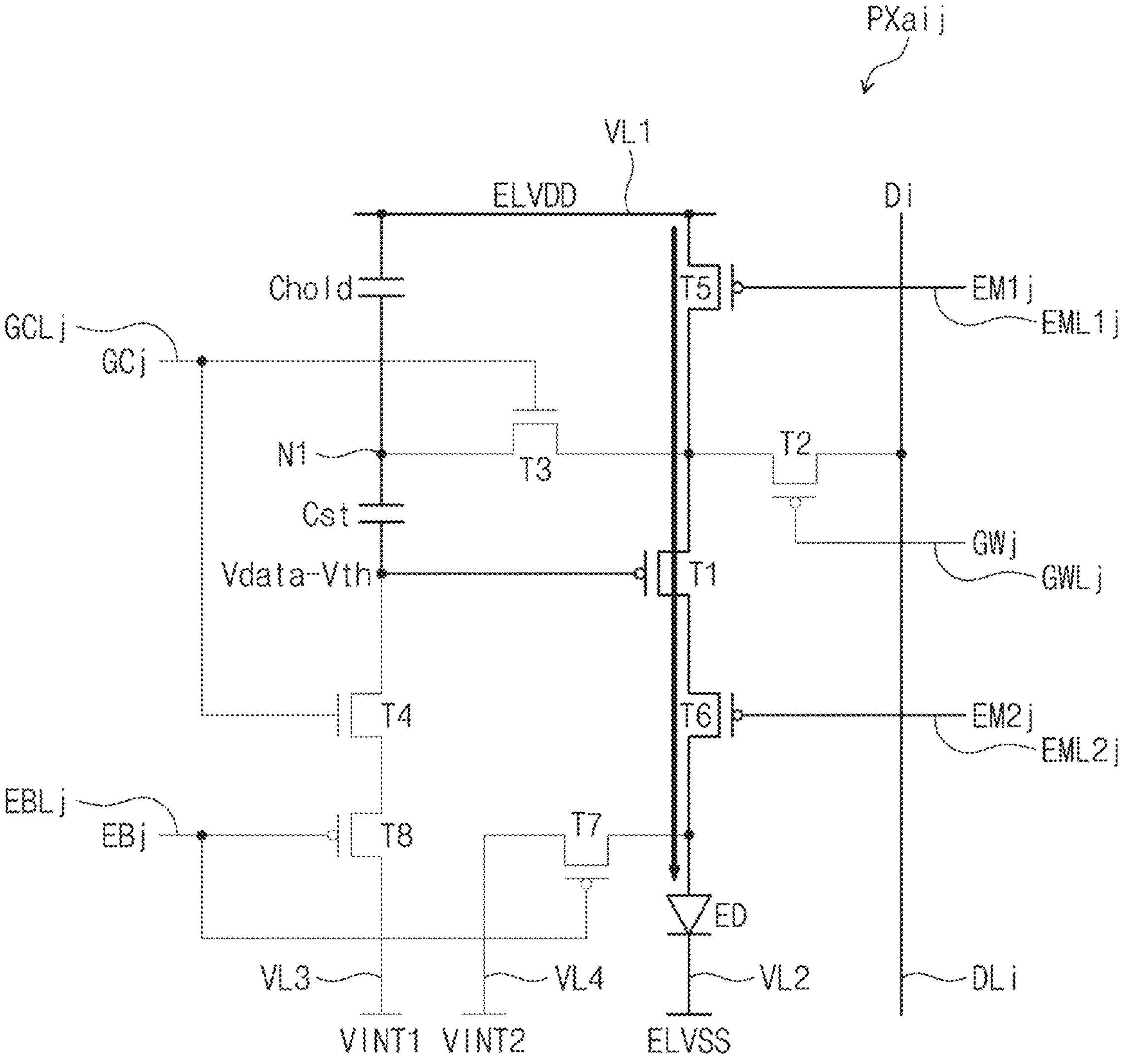

Referring to FIGS. 8 and 9D, all the scan signals GCj, GWj, and EBj may be transitioned to the inactive level in the fourth period t24 of the driving period DRP. Therefore, the second, third, fourth, seventh, and eighth transistors T2, T3, T4, T7 and T8 are turned off. Since each of the light emission control signals EMU and EM2*j* is at an active low level in the fourth period t24, each of the fifth transistor T5 and the sixth transistor T6 is turned on. As the fifth transistor T5 and the sixth transistor T6 are turned on, a current path may be formed from the first voltage line VL1 to the light emitting diode ED via the fifth transistor T5, the first transistor T1, and the sixth transistor T6.

The current flowing through the light emitting diode ED is proportional to $(Vgs-Vth)^2$ that is the square of the difference between the gate-source voltage (referred to as Vgs) of the first transistor T1 and the threshold voltage Vth of the first transistor T1. Since the voltage level of the gate electrode of the first transistor T1 is Vdata-Vth, the current flowing through the light emitting diode ED becomes proportional to $(ELVDD-Vdata)^2$ that is the square of the difference between the first driving voltage ELVDD and the voltage level Vdata corresponding to the data signal Di. In other words, the threshold voltage Vth of the first transistor T1 may not influence the current flowing through the light emitting diode ED.

Figure 9E:
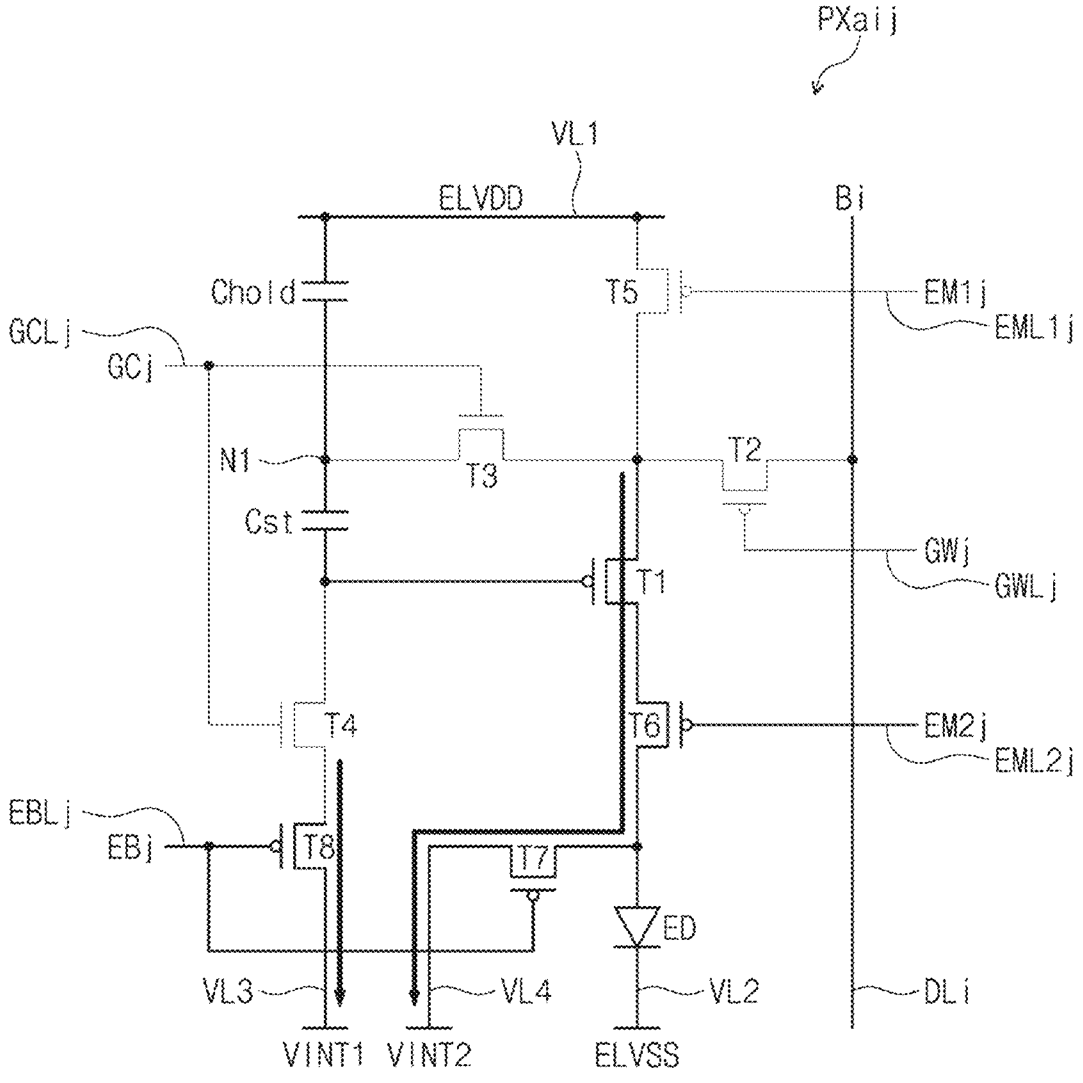

Referring to FIGS. 8 and 9E, the scan signal GCj is maintained at an inactive low level during the bias period BIP. Therefore, the third transistor T3 and the fourth transistor T4 are maintained in a turn-off state. In the fifth period t25 of the bias period BIP, the scan signal GWj is at a high level, and thus the second transistor T2 is turned off. In addition, when each of the light emission control signal EM2*j* and the scan signal EBj is transitioned to a low level in the fifth period t25, the sixth transistor T6, the seventh transistor T7 and the eighth transistor T8 are turned on. Accordingly, the current of the anode of the light emitting diode ED may be bypassed to the fourth voltage line VL4 through the seventh transistor T7. The fifth period t25 may be a bypass period in which the current of the anode of the light emitting diode ED is bypassed.

As the scan signal EBj is transitioned to the low level in the fifth period t25, even when the eighth transistor T8 is turned on, the fourth transistor T4 is in a turn-off state, and thus, the first initialization voltage VINT1 is not provided to the gate electrode of the first transistor T1. In other words, even when the gate electrode of the seventh transistor T7 and the gate electrode of the eighth transistor T8 commonly receive the scan signal EBj, the pixel PXaij may normally operate in the fifth period t25 of the bias period BIP.

Figure 9F:
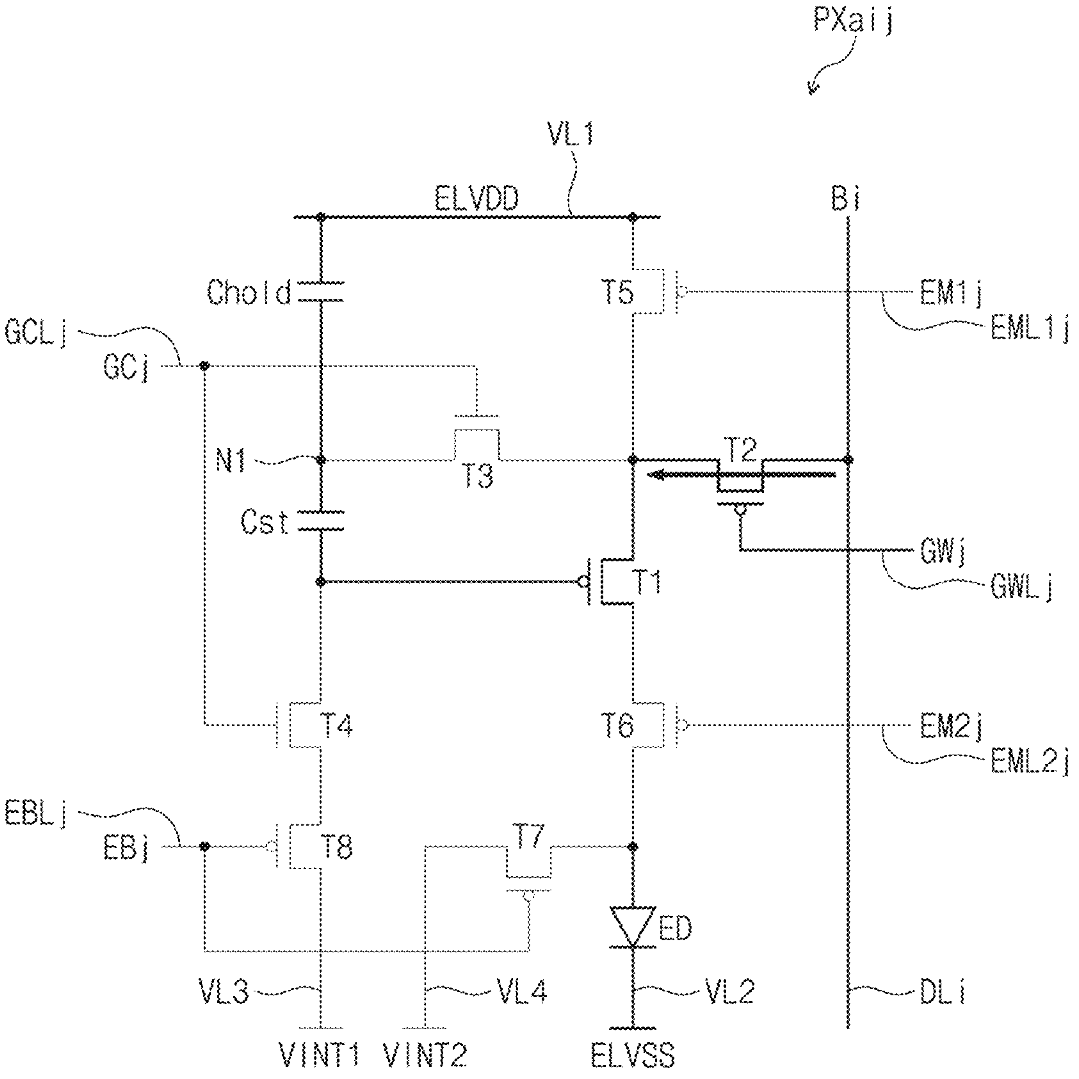

Referring to FIGS. 8 and 9F, since each of the light emission control signals EMU and EM2*j* and the scan signal EBj are at a high level in a sixth period t26 of the bias period BIP, the fifth transistor T5, the sixth transistor T6, the seventh transistor T7, and the eighth transistor T8 are turned off. When the scan signal GWj is transitioned to a low level in the sixth period t26, the second transistor T2 may be turned on and a bias signal Bi provided through the data line DLi may be provided to the first electrode of the first transistor T1. The bias signal Bi provided through the data line DLi in the sixth period t26 of the bias period BIP may have a prescribed voltage level (e.g., a voltage level between 3 to 7 V).

According to the hysteresis characteristics of the first transistor T1, a driving current of the first transistor T1 due to the data signal Di applied in the driving period DRP of the current frame may be influenced by the data signal Di applied in the driving period DRP of the previous frame.

As the bias signal Bi is provided to the first electrode of the first transistor T1 in the sixth period t26 of the bias period BIP, the brightness change caused by the hysteresis characteristics of the first transistor T1 may be effectively minimized. The sixth period t26 may be an on-bias period in which the bias signal Bi is provided to the first electrode of the first transistor T1.

Figure 10:
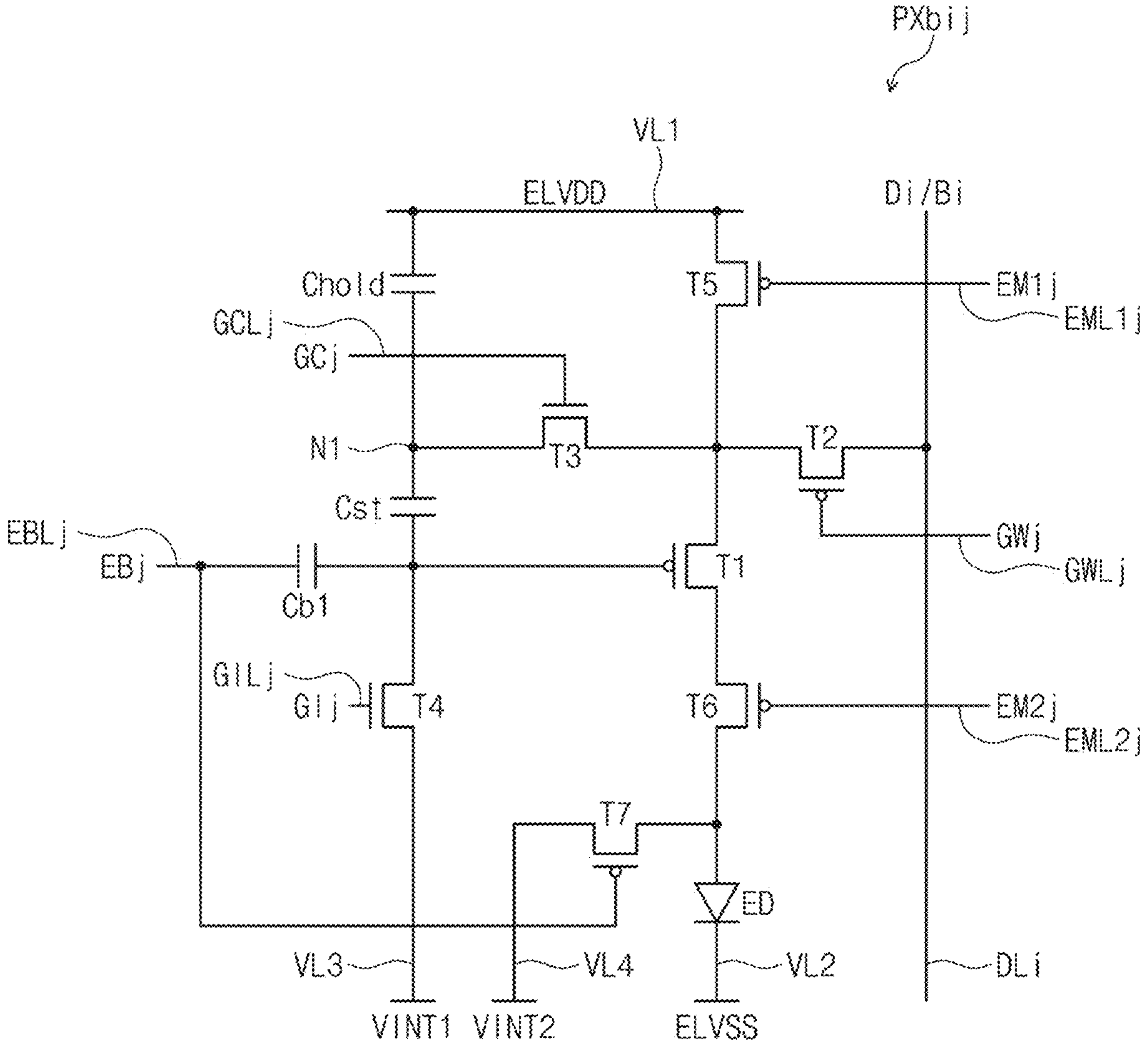
FIG. 10 is an equivalent circuit diagram of a pixel according to still another embodiment of the present invention.

FIG. 10 is an equivalent circuit diagram of a pixel according to still another embodiment of the present invention.

FIG. 10 illustrates, as an example, an equivalent circuit diagram of a pixel PXbij connected to an i-th data line DLi among the data lines DL1 to DLm shown in FIG. 1, j-th scan lines GILj, GCLj, GWLj and EBLj among the scan lines GIL1 to GILn, GCL1 to GCLn, GWL1 to GWLn, and EBL1 to EBLn, and j-th light emission control lines EML1*j* and EML2*j* among the light emission control lines EML11 to EML1*n* and EML21 to EML2*n*.

Each of the plurality of pixels PX shown in FIG. 1 may have the same circuit configuration as the equivalent circuit diagram of the pixel PXbij shown in FIG. 10.

Referring to FIG. 10, the pixel PXbij of the display device according to an embodiment includes first to seventh transistors T1, T2, T3, T4, T5, T6 and T7, capacitors Cst and Chold, a boosting capacitor Cb1, and at least one light emitting diode ED.

The first to seventh transistors T1 to T7, and the capacitors Cst and Chold of the pixel PXbij shown in FIG. 10 are the same as those of the pixel PXij shown in FIG. 2, and thus, the same reference numerals are given and the repetitive descriptions will be omitted.

In addition, the circuit configuration of the pixel PXbij according to an embodiment of the present invention is not limited to FIG. 10. The pixel PXbij shown in FIG. 10 is merely exemplary, and the circuit configuration of the pixel PXbij may be modified and practiced.

The boosting transistor Cb1 is connected between the scan line EBLj and the gate electrode of the first transistor T1.

Referring to FIGS. 4 and 10, when the scan signal GWj is at a low level in the third period t13, the voltage Vdata corresponding to the data signal Di is provided to one end of the capacitor Cst, namely, the first node N1, and thus, a voltage level at the other end of the capacitor Cst, namely, the gate electrode of the first transistor T1 is changed to Vdata-Vth (refer to FIG. 5C). Here, when the scan signal EBj is transitioned from the low level to the high level, a voltage level of the gate electrode of the first transistor T1 is increased.

As described above, the current flowing through the light emitting diode ED becomes proportional to (ELVDD-Vdata) 2 that is the square of the difference between the first driving voltage ELVDD and the voltage level Vdata corresponding to the data signal Di.

When the data signal Di corresponds to a black gray scale, the current flowing through the light emitting diode ED may be minimized as the voltage level Vdata corresponding to the data signal Di becomes higher. However, there is a limit to increase the voltage level Vdata corresponding to the data signal Di. When the scan signal EBj input to one end of the boosting capacitor Cb1 is transitioned from the low level to the high level, the voltage provided to the gate electrode of the first transistor T1 increases and thus the current flowing through the light emitting diode ED may be minimized.

In FIG. 10, the one end of the boosting capacitor Cb1 is connected to the scan line EBLj, but the embodiment of the present invention is not limited thereto. In an embodiment, the one end of the boosting capacitor Cb1 may be connected to the scan line GWLj. Since the scan signal GWj is transitioned from the low level to the high level at the end of the third period t13, the voltage to be provided to the gate electrode of the first transistor T1 may increase.

In FIG. 10, the other end of the boosting capacitor Cb1 is connected to the gate electrode of the first transistor T1, but the embodiment of the present invention is not limited thereto. In an embodiment, the other end of the boosting capacitor Cb1 may be connected to the first node N1. A voltage difference between the one end and the other end of the capacitor Cst is the same as the threshold voltage Vth, and, when the voltage at the one end of the capacitor Cst is boosted, the voltage of the other end of the capacitor Cst may also increase.

Figure 11:
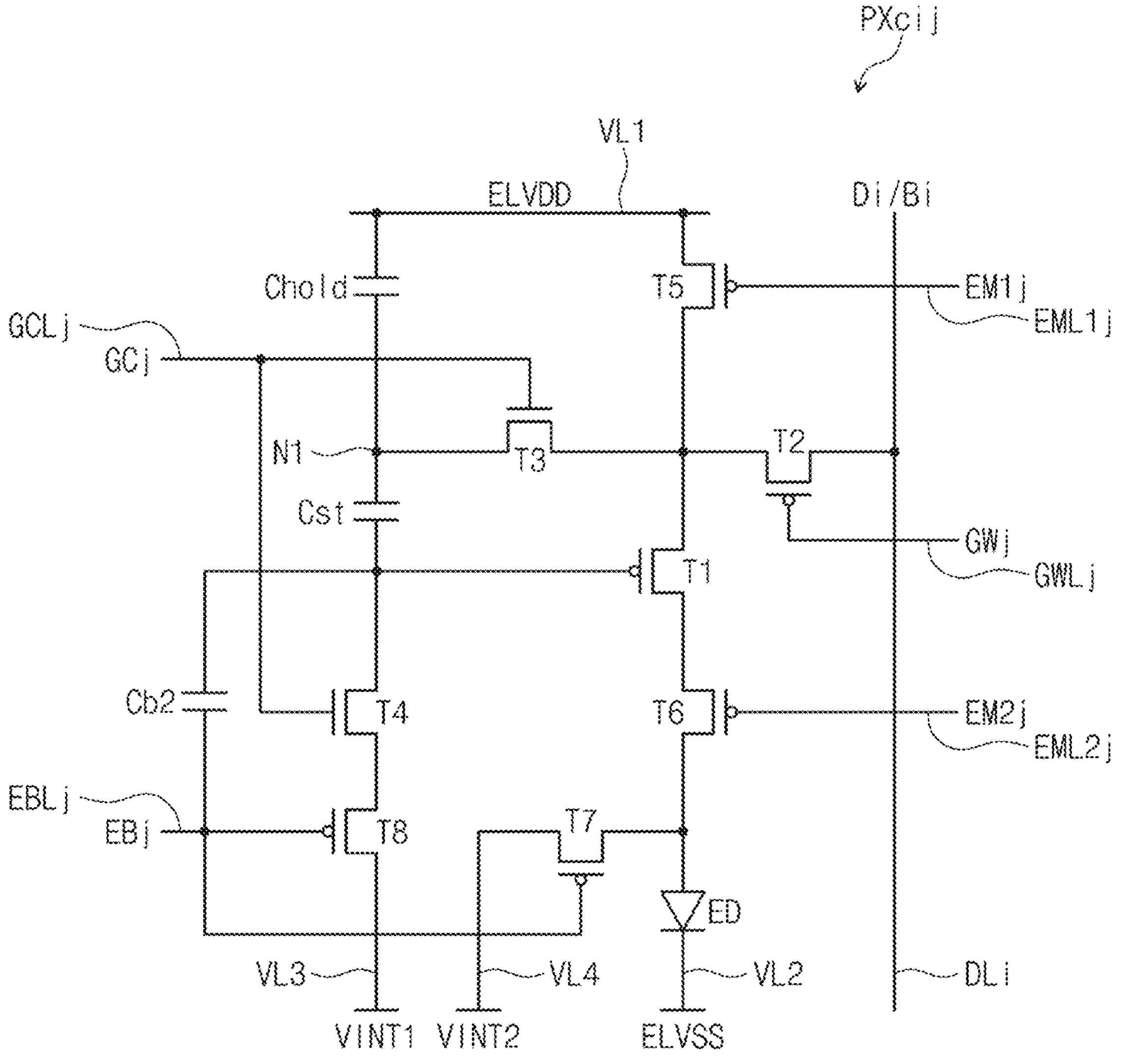
FIG. 11 is an equivalent circuit diagram of a pixel according to yet another embodiment of the present invention.

FIG. 11 is an equivalent circuit diagram of a pixel according to yet another embodiment of the present invention.

FIG. 11 illustrates an equivalent circuit diagram of a pixel PXcij connected to an i-th data line DLi among the data lines DL1 to DLm shown in FIG. 6, j-th scan lines GCLj, GWLj and EBLj among the scan lines GCL1 to GCLn, GWL1 to GWLn, and EBL1 to EBLn, and j-th light emission control lines EML1*j* and EML2*j* among the light emission control lines EML11 to EML1*n* and EML21 to EML2*n*.

Each of the plurality of pixels PXa shown in FIG. 6 may have the same circuit configuration as the equivalent circuit diagram of the pixel PXcij shown in FIG. 11.

Referring to FIG. 11, the pixel PXcij of the display device according to an embodiment includes first to eighth transistors T1 to T8, capacitors Cst and Chold, a boosting capacitor Cb2, and at least one light emitting diode ED.

The first to eighth transistors T1 to T8, and the capacitors Cst and Chold of the pixel PXcij shown in FIG. 11 are the same as those of the pixel PXaij shown in FIG. 7, and thus, the same reference numerals are given and the repetitive descriptions will be omitted.

In addition, the circuit configuration of the pixel PXcij according to an embodiment of the present invention is not limited to FIG. 11. The pixel PXcij shown in FIG. 11 is merely exemplary, and the circuit configuration of the pixel PXcij may be modified and practiced.

The boosting transistor Cb2 is connected between the scan line EBLj and the gate electrode of the first transistor T1.

Referring to FIGS. 8 and 11, when the scan signal GWj is at a low level in the third period t23, a voltage Vdata corresponding to the data signal Di is provided to one end of the capacitor Cst, namely, the first node N1, and thus, a voltage level at the other end of the capacitor Cst, namely, the gate electrode of the first transistor T1 is changed to Vdata-Vth (refer to FIG. 9C). Here, when the scan signal EBj is transitioned from the low level to the high level, a voltage level of the gate electrode of the first transistor T1 is increased.

As described above, the current flowing through the light emitting diode ED becomes proportional to (ELVDD-Vdata) 2 that is the square of the difference between the first driving voltage ELVDD and the voltage level Vdata corresponding to the data signal Di.

When the data signal Di corresponds to a black gray scale, the current flowing through the light emitting diode ED may be minimized as the voltage level Vdata corresponding to the data signal Di becomes higher. However, there is a limit to increase the voltage level Vdata corresponding to the data signal Di. When the scan signal EBj input to one end of the boosting capacitor Cb2 is transitioned from the low level to the high level, a voltage provided to the gate electrode of the first transistor T1 increases and thus the current flowing through the light emitting diode ED may be minimized.

In FIG. 11, the one end of the boosting capacitor Cb2 is connected to the scan line EBLj, but the embodiment of the present invention is not limited thereto. In an embodiment, the one end of the boosting capacitor Cb2 may be connected to the scan line GWLj. Since the scan signal GWj is transitioned from the low level to the high level at the end of the third period t23, the voltage to be provided to the gate electrode of the first transistor T1 may increase.

Figure 12:
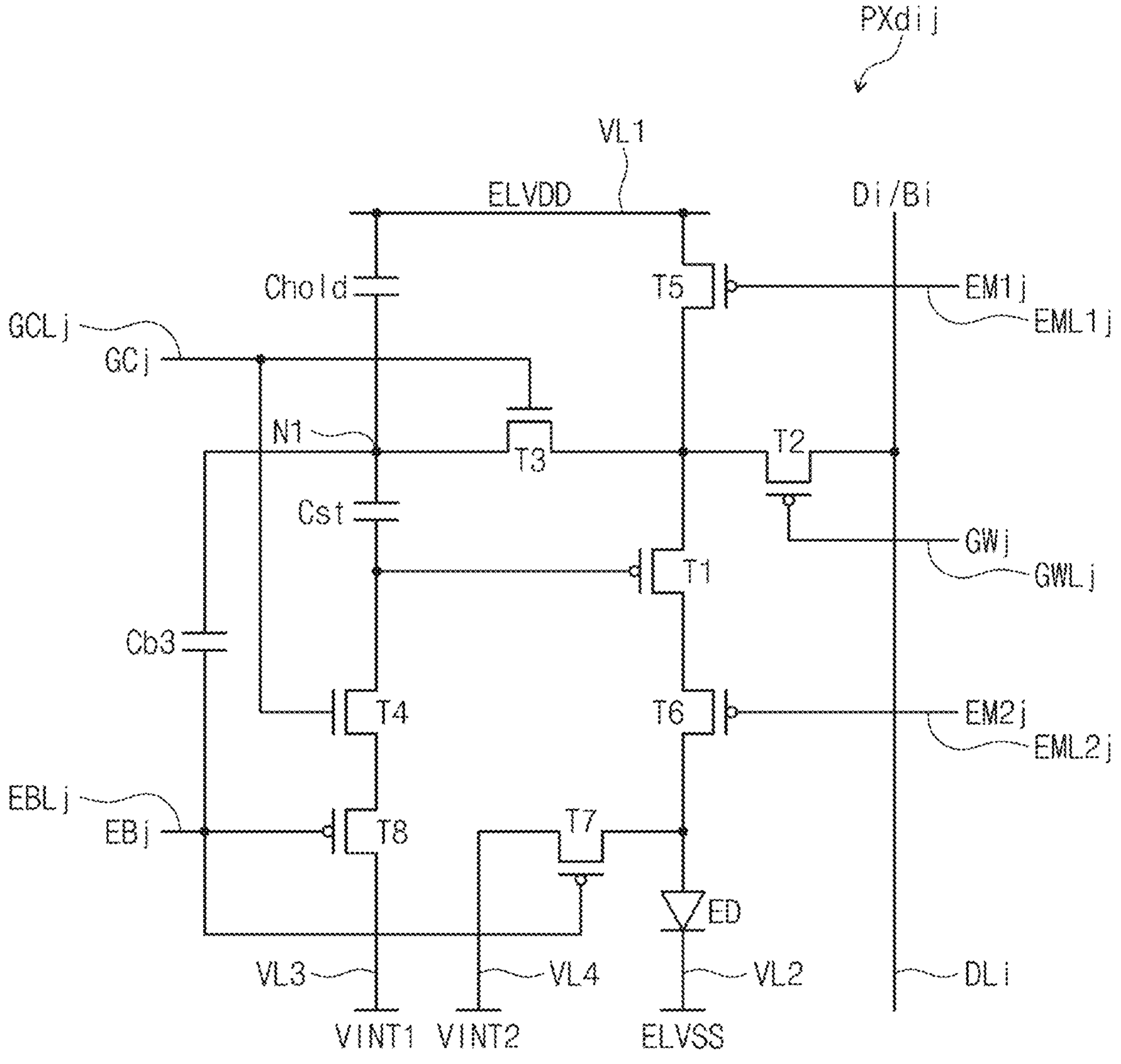
FIG. 12 is an equivalent circuit diagram of a pixel according to another embodiment of the present invention.

FIG. 12 is an equivalent circuit diagram of a pixel according to another embodiment of the present invention.

FIG. 12 illustrates an equivalent circuit diagram of a pixel PXdij connected to an i-th data line DLi among the data lines DL1 to DLm shown in FIG. 6, j-th scan lines GCLj, GWLj and EBLj among the scan lines GIL1 to GCL1 to GCLn, GWL1 to GWLn, and EBL1 to EBLn, and j-th light emission control lines EML1*j* and EML2*j* among the light emission control lines EML11 to EML1*n* and EML21 to EML2*n*.

Each of the plurality of pixels PXa shown in FIG. 6 may have the same circuit configuration as the equivalent circuit diagram of the pixel PXdij shown in FIG. 12.

Referring to FIG. 12, the pixel PXdij of the display device according to an embodiment includes first to eighth transistors T1 to T8, capacitors Cst and Chold, a boosting capacitor Cb3, and at least one light emitting diode ED.

The first to eighth transistors T1 to T8, and the capacitors Cst and Chold of the pixel PXdij shown in FIG. 12 are the same as those of the pixel PXaij shown in FIG. 7, and thus, the same reference numerals are given and the repetitive descriptions will be omitted.

In addition, the circuit configuration of the pixel PXdij according to an embodiment of the present invention is not limited to FIG. 12. The pixel PXdij shown in FIG. 12 is merely exemplary, and the circuit configuration of the pixel PXdij may be modified and practiced.

The boosting transistor Cb3 is connected between the scan line EBLj and the first node N1. A voltage difference between the one end and the other end of the capacitor Cst is the same as the threshold voltage Vth, and when the voltage at the one end of the capacitor Cst is boosted, the voltage of the other end of the capacitor Cst may also increase. In other words, when the scan signal EBj connected to one end of the boosting capacitor Cb3 is transitioned from a low level to a high level, a voltage level at the first node N1 increases, and thus a voltage provided to the gate electrode of the first transistor T1 may also increase. Therefore, when the data signal Di corresponds to a black gray scale, the current flowing through the light emitting diode ED may be minimized.

In FIG. 12, the one end of the boosting capacitor Cb3 is connected to the scan line EBLj, but the embodiment of the present invention is not limited thereto. In an embodiment, the one end of the boosting capacitor Cb3 may be connected to the scan line GWLj. Since the scan signal GWj is transitioned from the low level to the high level at the end of the third period t23, the voltage to be provided to the gate electrode of the first transistor T1 may increase.

Figure 13:
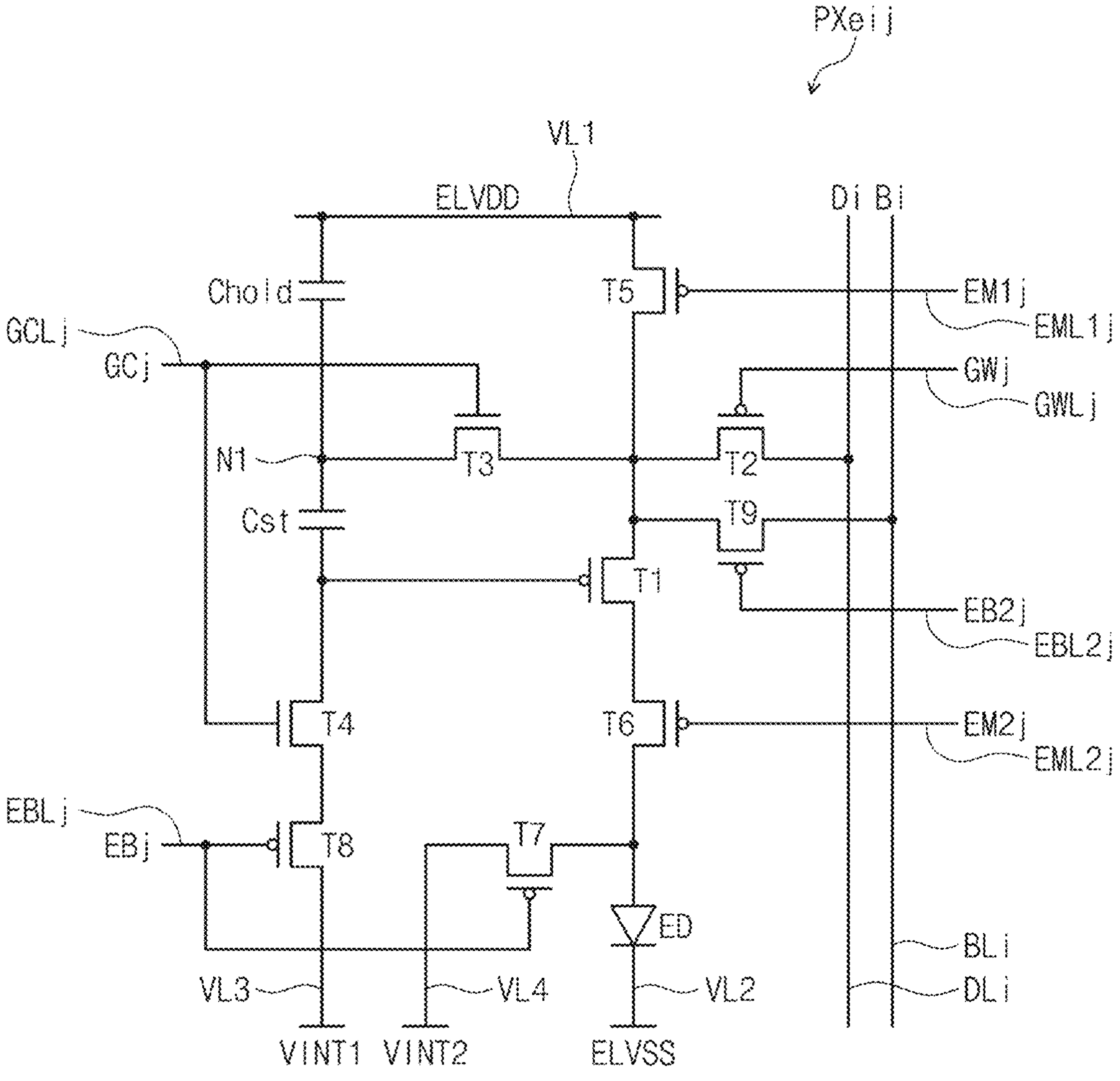
FIG. 13 is an equivalent circuit diagram of a pixel according to still another embodiment of the present invention.

FIG. 13 is an equivalent circuit diagram of a pixel according to still another embodiment of the present invention.

Referring to FIG. 13, a pixel PXeij of the display device according to an embodiment includes first to ninth transistors T1, T2, T3, T4, T5, T6, T7, T8, and T9, capacitors Cst and Chold, and at least one light emitting diode ED.

In this embodiment, each of the first, second, fifth, sixth, seventh, eighth, and ninth transistors T1, T2, T5, T6, T7, T8, and T9 among the first to ninth transistors T1 to T9 may be a P-type transistor having an LTPS semiconductor layer, and the third and fourth transistors T3 and T4 may be N-type transistors having an oxide semiconductor as a semiconductor layer. In another embodiment, the entirety of the first to ninth transistors T1 to T9 may be P-type transistors, or N-type transistors. In another embodiment, at least one of the first to ninth transistors T1 to T9 may be a P-type transistor and the remaining transistors may be N-type transistors.

In addition, the circuit configuration of the pixel PXeij according to the embodiment of the present invention is not limited to FIG. 13. The pixel PXeij shown in FIG. 13 is merely exemplary, and the circuit configuration of the pixel PXeij may be modified and practiced.

The first to eighth transistors T1 to T8, and the capacitors Cst and Chold of the pixel PXeij shown in FIG. 13 are the same as those of the pixel PXaij shown in FIG. 7, and thus, the same reference numerals are given and the repetitive descriptions will be omitted.

The ninth transistor T9 includes a first electrode connected to the bias line BLi, a second electrode connected to the first electrode of the first transistor T1, and a gate electrode connected to the scan line EBL2*j*. The scan line EBL2*j* provides a scan signal EB2*j* to the gate electrode of the ninth transistor T9.

In the example shown in FIG. 13, the second electrode of the ninth transistor T9 is connected to the first electrode of the first transistor T1, but the embodiment of the present invention is not limited thereto. For example, the second electrode of the ninth transistor T9 may be connected to the second electrode of the first transistor T1.

Figure 14:
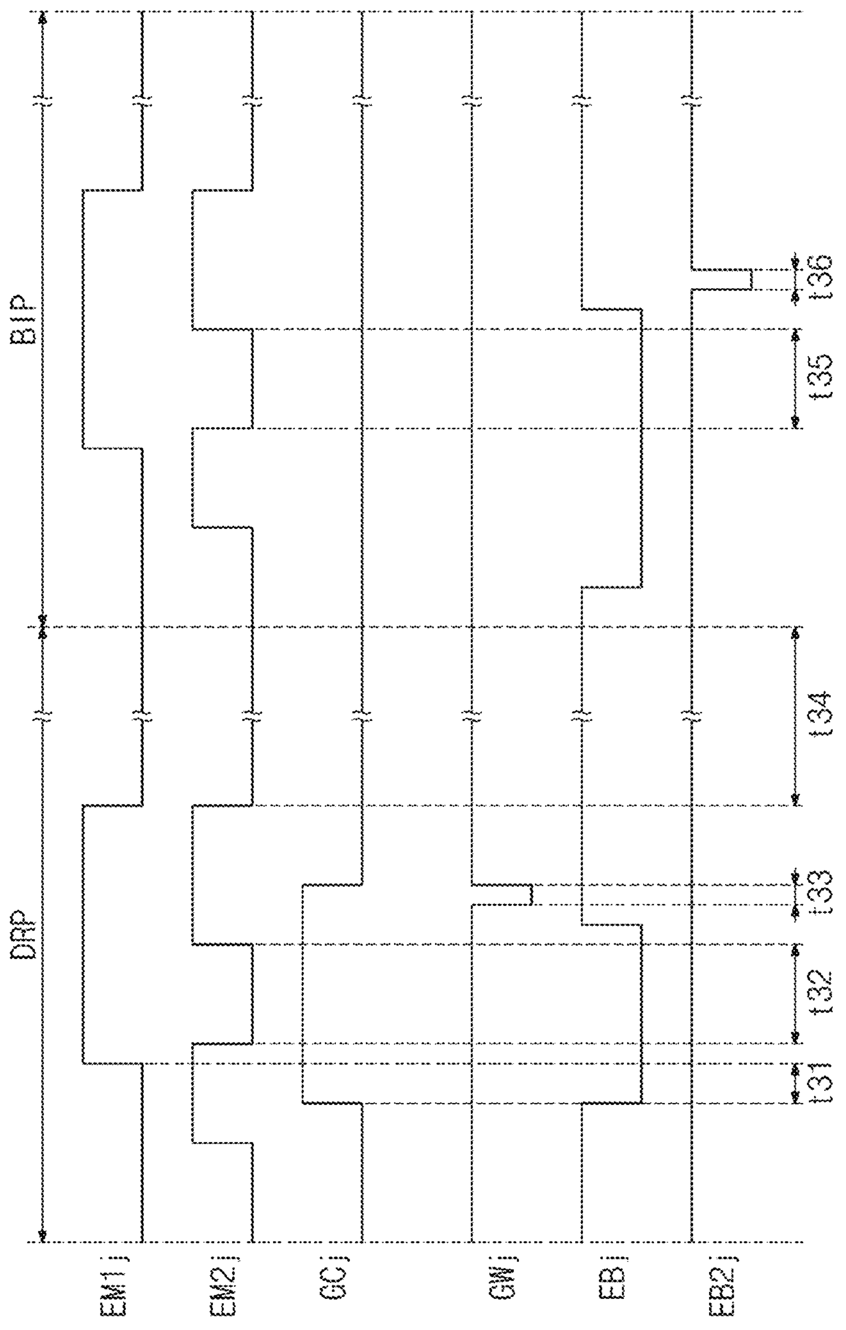
FIG. 14 is a timing diagram of scan signals and light emission control signals for explaining operations of the pixel shown in FIG. 13.

FIG. 14 is a timing diagram of scan signals and light emission control signals for explaining operations of the pixel shown in FIG. 13.

Referring to FIGS. 13 and 14, the driving period DRP may include first to fourth periods t31 to t34, and the bias period BIP may include a fifth period t35 and a sixth period t36.

As the scan signals GCj, GWj, and EBj and the light emission control signals EMU and EM2*j* are provided to the pixel PXeij in each of the first to fourth periods t31 to t34 of the driving period DRP, the light emitting diode ED may display an image corresponding to the data signal Di provided through the data line DLi.

During the driving period DRP, the scan signal EB2*j* is maintained to an inactive high level.

During the bias period BIP, the scan signal GCj is maintained to an inactive low level, and the scan signal GWj is maintained to the inactive high level. Therefore, the second transistor T2, the third transistor T3 and the fourth transistor T4 are maintained in a turn-off state. When each of the light emission control signal EM2*j* and the scan signal EBj is transitioned to the low level in the fifth period t35 in the bias period BIP, the sixth transistor T6, the seventh transistor T7 and the eighth transistor T8 are turned on. Accordingly, the current of the anode of the light emitting diode ED may be bypassed to the fourth voltage line VL4 through the seventh transistor T7.

Since each of the light emission control signals EM1*j* and EM2*j* and the scan signal EBj is at a high level in the sixth period t36 of the bias period BIP, the fifth transistor T5, the sixth transistor T6, the seventh transistor T7, and the eighth transistor T8 are turned off. When the scan signal EB2*j* is transitioned to a low level in the sixth period t36, the ninth transistor T9 may be turned on and a bias signal Bi provided through the bias line BLi may be provided to the first electrode of the first transistor T1. The bias signal Bi provided through the data line DLi in the sixth period t36 of the bias period BIP may have a prescribed voltage level (e.g., a voltage level between 3 to 7 V).

Figure 15:
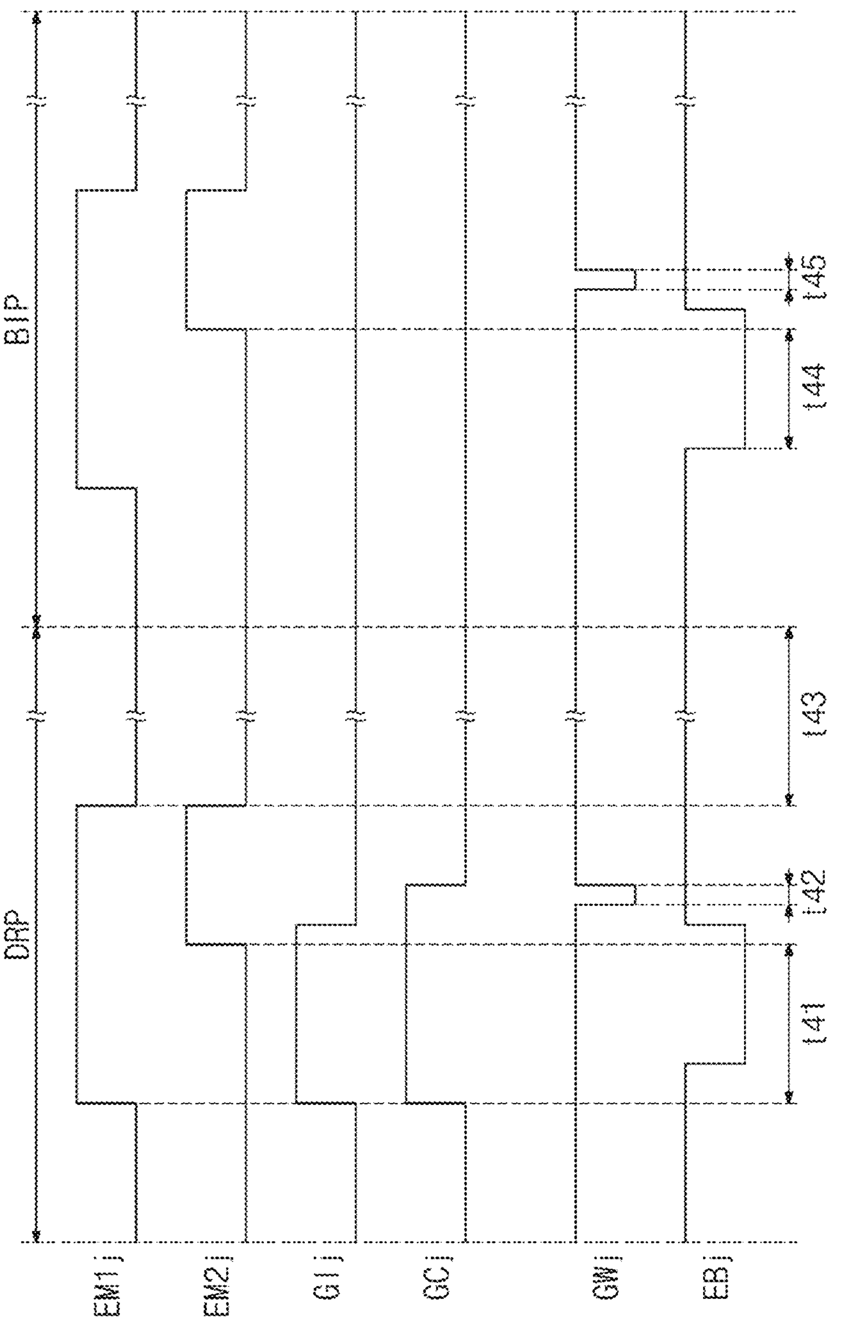
FIG. 15 is a timing diagram of scan signals and light emission control signals for explaining operations in the driving period and the bias period of pixel shown in FIG. 2.

FIG. 15 is a timing diagram of scan signals and light emission control signals for explaining operations in the driving period and the bias period of pixel shown in FIG. 2.

Figure 16:
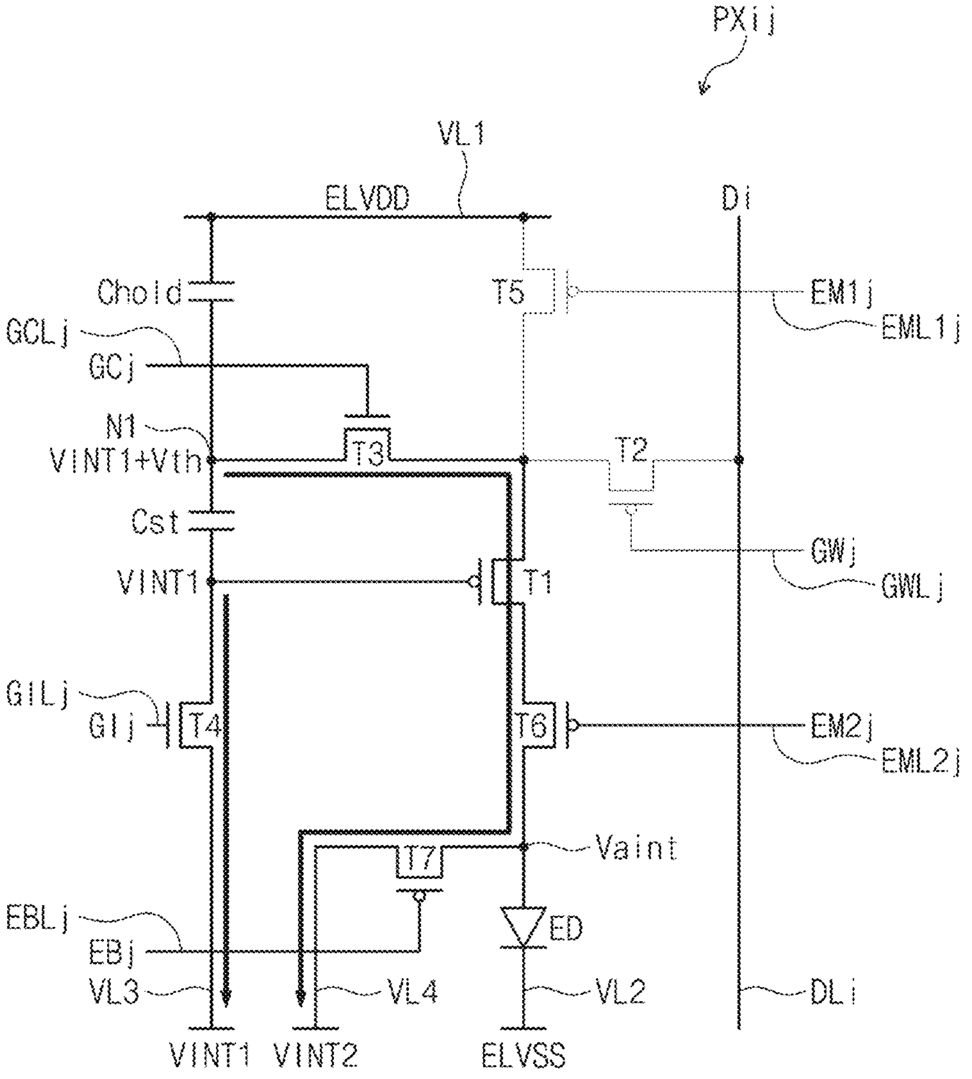
FIG. 16 is a diagram for explaining an operation in the first period shown in FIG. 15 of the pixel shown in FIG. 2.

FIG. 16 is a diagram for explaining an operation in the first period t41 shown in FIG. 15 of the pixel shown in FIG. 2.

Referring to FIGS. 15 and 16, the driving period DRP includes first to third periods t41 to t43, and the bias period BIP includes a fourth period t44 and a fifth period t45.

The third transistor T3 and the fourth transistor T4 are turned on in response to the scan signals GCj and GIj of a high level in the first period t41 of the driving period DRP, respectively. As the fourth transistor T4 is turned on, the first initialization voltage VINT1 is provided to the gate electrode of the first transistor T1 to initialize the first transistor T1.

When the scan signal EBj is transitioned to a low level in the first period t41, the seventh transistor T7 is turned on. As the seventh transistor T7 is turned on, the current of the anode of the light emitting diode ED may be bypassed to the fourth voltage line VL4.

The scan signal GWj in the first period t41 is at the high level, and thus the second transistor T2 is maintained in a turn-off state.

In addition, since the light emission control signal EM1*j* is at a high level in the first period t41, the fifth transistor T5 is turned off, and, since the light emission control signal EM2*j* is at a low level, the sixth transistor T6 is turned on.

As the first transistor T1 operates as a source follower in a state of the third transistor T3 being turned on, a voltage VINT1+Vth may be provided to the first node N1, where the voltage VINT1+Vth is a voltage higher than the first initialization voltage VINT1 provided to the gate electrode of the first transistor T1 by a threshold voltage Vth of the first transistor T1. In other words, a voltage difference between opposite ends of the capacitor Cst is equal to the threshold voltage Vth of the first transistor T1. The first period t41 may be a bypass and compensation period in which the first transistor T1 is initialized, the current of the anode of the light emitting diode ED is bypassed, and the threshold voltage Vth of the first transistor T1 is compensated.

The second period t42 and the third period t43 of the driving period DRP shown in FIG. 15 respectively correspond to the third period t13 and the fourth period t14 of the driving period DRP shown in FIG. 4, and thus repetitive descriptions will be omitted. The fourth period t44 and the fifth period t45 of the bias period BIP shown in FIG. 15 respectively correspond to the fifth period t15 and the sixth period t16 of the bias period BIP shown in FIG. 4, and thus repetitive descriptions will be omitted.

Figure 17:
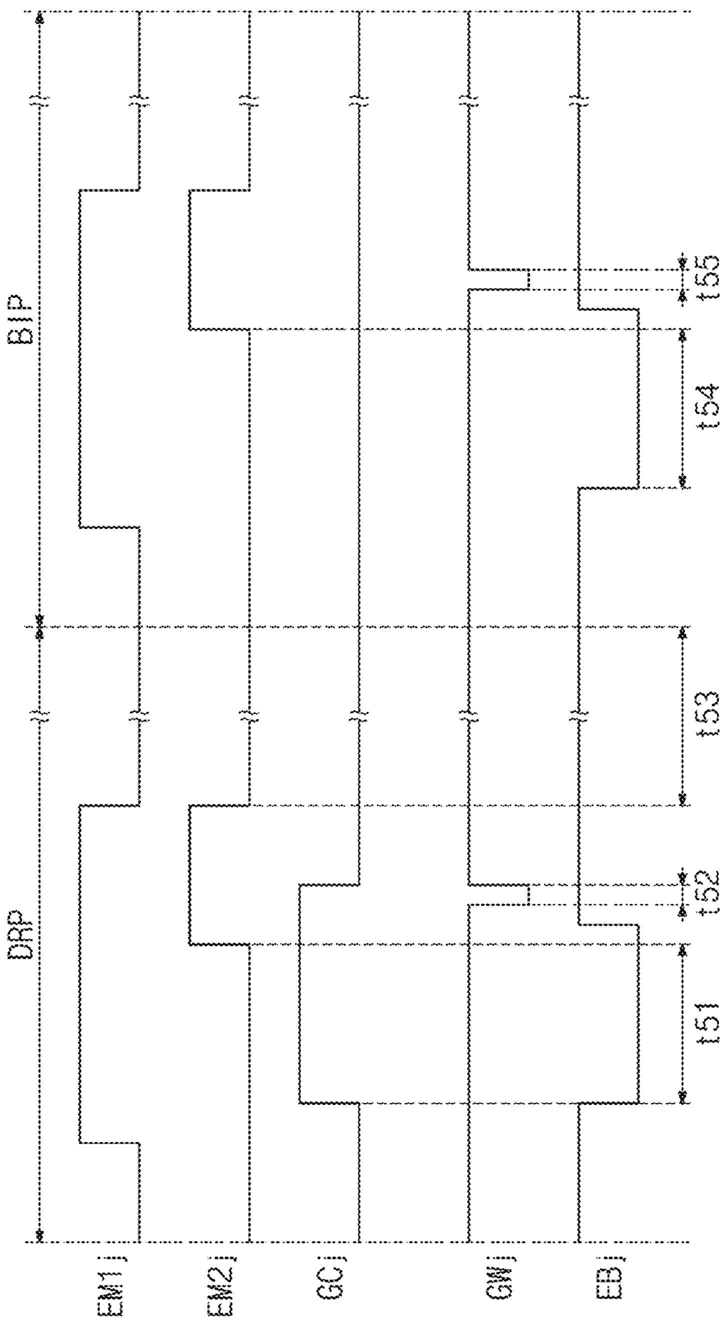
FIG. 17 is a timing diagram of scan signals and light emission control signals for explaining operations in the driving period and the bias period of pixel shown in FIG. 7.

FIG. 17 is a timing diagram of scan signals and light emission control signals for explaining operations in the driving period and the bias period of pixel shown in FIG. 7

Figure 18:
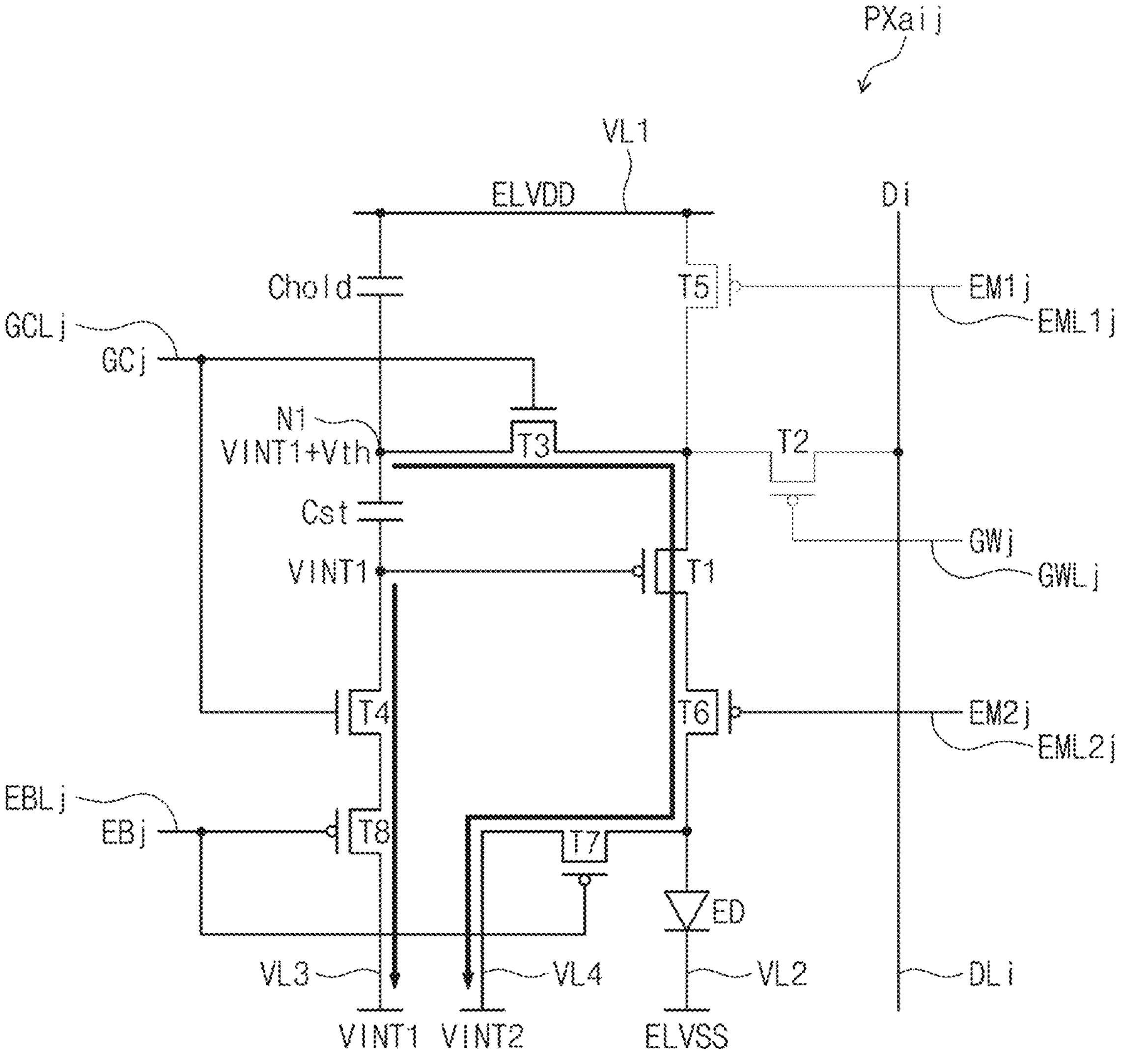
FIG. 18 is a diagram for explaining an operation in the first period shown in FIG. 17 of the pixel shown in FIG. 7.

FIG. 18 is a diagram for explaining an operation in the first period t51 shown in FIG. 17 of the pixel shown in FIG. 7.

Referring to FIGS. 17 and 18, the driving period DRP includes first to third periods t51 to t53, and the bias period BIP includes a fourth period t54 and a fifth period t55.

Both the third transistor T3 and the fourth transistor T4 are turned on in response to a high level scan signal GCj in the first period t51 of the driving period DRP. When the scan signal EBj is transitioned to a low level in the first period t51, each of the seventh transistor T7 and the eighth transistor T8 is turned on.

As the fourth transistor T4 and the eighth transistor T8 are turned on, the first initialization voltage VINT1 may be provided to the gate electrode of the first transistor T1 to initialize the first transistor T1.

In addition, as the seventh transistor T7 is turned on, the current of the anode of the light emitting diode ED may be bypassed to the fourth voltage line VL4.

The scan signal GWj in the first period t51 is at the high level, and thus the second transistor T2 is turned off. In addition, since the light emission control signal EMU is at the high level and the light emission control signal EM2*j* is at the low level in the first period t51, the fifth transistor T5 is turned off and the sixth transistor T6 is turned on.

As the first transistor T1 operates as a source follower in a state of the third transistor T3 being turned on, a voltage VINT1+Vth may be provided to the first node N1, where the voltage VINT1+Vth is a voltage higher than the first initialization voltage VINT1 provided to the gate electrode of the first transistor T1 by a threshold voltage Vth of the first transistor T1. In other words, a voltage difference between opposite ends of the capacitor Cst is equal to the threshold voltage Vth of the first transistor T1. The first period t51 may be a bypass and compensation period in which the first transistor T1 is initialized, the current of the anode of the light emitting diode ED is bypassed, and the threshold voltage Vth of the first transistor T1 is compensated.

The second period t52 and the third period t53 of the driving period DRP shown in FIG. 17 respectively correspond to the third period t23 and the fourth period t24 of the driving period DRP shown in FIG. 8, and thus repetitive descriptions will be omitted. The fourth period t54 and the fifth period t55 of the bias period BIP shown in FIG. 17 respectively correspond to the fifth period t25 and the sixth period t26 of the bias period BIP shown in FIG. 8, and thus repetitive descriptions will be omitted.

Figure 19:
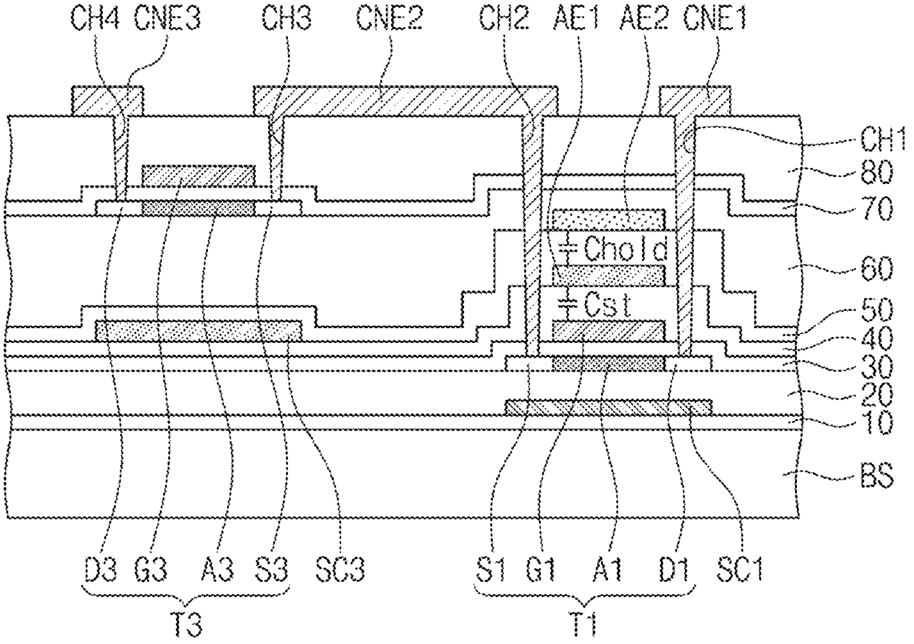
FIG. 19 is a cross-sectional view illustrating a part of a pixel according to an embodiment of the present invention.

FIG. 19 is a cross-sectional view illustrating a part of a pixel according to an embodiment of the present invention.

In FIG. 19, the light emitting element ED among the components shown in FIG. 2 is omitted for easy description. In addition, in FIG. 19, parts of the first transistor T1 and the third transistor T3 are briefly shown.

Referring to FIGS. 2 and 19, the display panel DP may include a base substrate BS and a plurality of insulation layers 10, 20, 30, 40, 50, 60, 70 and 80 in addition to the pixel.

An insulation layer, a semiconductor layer, and a conductive layer may be formed through processes of coating, deposition and the like. Thereafter, the insulation layer, the semiconductor layer, and the conductive layer may be selectively patterned through photolithography and etching processes. Through these processes, semiconductor patterns, conductive patterns, signal lines and the like are formed. The patterns disposed on the same layer are formed through the same processes.

The base layer BS may include a synthetic resin film. The synthetic resin layer may include a thermosetting resin. In particular, the synthetic resin layer may be a polyimide-based resin layer, but the material is not particularly limited.

The synthetic resin layer may include at least one among an acrylic-based resin, a meta-acrylic-based resin, polyisoprene, a vinyl-based resin, an epoxy-based resin, a urethane-based resin, a cellulose-based resin, a siloxane-based resin, a polyamide-based resin, and a parylene-based resin. Besides, the base layer BS may include a glass substrate, a metal substrate, or an organic/inorganic composite material substrate, etc.

At least one inorganic layer is composed on the top surface of the base layer BS. The inorganic layer may include at least any one among aluminum oxide, titanium oxide, silicon oxide, silicon nitride, silicon oxynitride, zirconium oxide, and hafnium oxide. The inorganic layer may be formed from multiple layers. The first insulation layer 10 may be a barrier layer for preventing inflow of a foreign matter from the outside. The first insulation layer 10 may include a silicon oxide layer and a silicon nitride layer. Each of them may be provided in plural, and the silicon oxide layers and the silicon nitride layers may be alternately laminated.

A conductive layer (hereinafter, a first conductive layer) is disposed on the first insulation layer 10. The first conductive layer may include a plurality of conductive patterns. In FIG. 19, a first bottom gate SC1 is illustrated as an example of the conductive pattern of the first conductive layer.

A second insulation layer 20 may be disposed on the first insulation layer 10 to cover the first bottom gate SC1. The second insulation layer 20 increases the bonding strength between the base layer BS and the semiconductor pattern and/or the conductive pattern. The second insulation layer 20 may be a buffer layer including silicon oxide layers and silicon nitride layers. The silicon oxide layers and the silicon nitride layers may be alternately laminated.

The semiconductor layer may be disposed on the second insulation layer 20. The semiconductor layer may include a plurality of semiconductor patterns. The semiconductor pattern may include a crystalline semiconductor material. For example, the semiconductor pattern may include a polycrystalline semiconductor material such as polycrystalline silicon.

As shown in FIG. 19, a first electrode S1 of the first transistor T1, a semiconductor region A1, a second electrode D1 are formed from the semiconductor patterns. The first electrode S1 and the second electrode D1 of the first transistor T1 extend from the semiconductor region A1 in the opposite directions.

A third insulation layer 30 is disposed on the second insulation layer 20.

A conductive layer (hereinafter, a second conductive layer) is disposed on the third insulation layer 30. The second conductive layer may include a plurality of conductive patterns. In FIG. 19, a first gate electrode G1 is illustrated as an example of the conductive pattern of the second conductive layer.

The fourth insulation layer 40 which cover the first gate electrode G1 is disposed on the third insulation layer 30. The fourth insulation layer 40 may be an inorganic material and/or organic material layer, and have a single layer or multilayer structure.

A conductive layer (hereinafter, a third conductive layer) is disposed on the fourth insulation layer 40. The third conductive layer may include a plurality of conductive patterns. In FIG. 19, a first electrode AE1 and a third bottom gate SC3 are illustrated as an example of the conductive patterns of the third conductive layer. The first electrode AE1 may overlap the first gate electrode G1.

A fifth insulation layer 50 which cover the first electrode AE1 and the third bottom gate SC3 is disposed on the fourth insulation layer 40. In the present embodiment, the fifth insulation layer 50 may be an organic layer and have a single layer structure, but is not particularly limited.

A conductive layer (hereinafter, a fourth conductive layer) is disposed on the fifth insulation layer 50. The fourth conductive layer may include a second electrode AE2. The second electrode AE2 may overlap the first electrode AE1.

The sixth insulation layer 60 which cover the second electrode AE2 is disposed on the fifth insulation layer 50.

A semiconductor layer may be disposed on the sixth insulation layer 60. The semiconductor layer may include a plurality of semiconductor patterns. The semiconductor pattern may include metal oxides. The metal oxide semiconductor may include a crystalline or amorphous oxide semiconductor. For example, the oxide semiconductor may include a metal oxide of zinc (Zn), indium (In), gallium (Ga), tin (Sn), titanium (Ti) or the like, or a mixed material of a metal such as zinc (Zn), indium (In), gallium (Ga), tin (Sn), or titanium (Ti) and an oxide thereof. The oxide semiconductor may include indium tin oxide ("ITO"), indium gallium zinc oxide ("IGZO"), zinc oxide (ZnO), indium zinc oxide (IZO), zinc indium oxide ("ZIO"), indium oxide (InO), titanium oxide (TiO), indium zinc tin oxide ("IZTO"), zinc tin oxide ("ZTO") or the like.

The semiconductor pattern may include a plurality of areas divided according to whether a metal oxide is reduced. A region in which the metal oxide is reduced (hereinafter, a reduction region) has high conductivity in comparison to a region in which the metal oxide is not reduced (hereinafter, non-reduction region). The reduction region may substantially have a role of a source/drain or a signal line of a transistor. The non-reduction region substantially corresponds to a semiconductor region (or channel) of the transistor. In other words, a part of the semiconductor pattern may be the semiconductor region of the transistor, another part may be a source/drain of the transistor, and another part may be a signal delivery region.

As shown in FIG. 19, a first electrode S3, a semiconductor region A3, a second electrode D3 of the third transistor T3 are formed from the semiconductor patterns. The first electrode S3 and the second electrode D3 of the first transistor T3 extend from the semiconductor region A3 in the opposite directions. The aforementioned first bottom gate SC1 and the third bottom gate SC3 have a function of a light shield pattern. The first bottom gate SC1 and the third bottom gate SC3 are respectively disposed under the semiconductor region A1 of the first transistor T1 and the semiconductor region A3 of the third transistor T3 to block light incident thereto from the outside.

The seventh insulation layer 70 which cover the first electrode S3, the semiconductor region A3, the second electrode D3 of the third transistor T3 is formed on the sixth insulation layer 60.

A conductive layer (hereinafter, a fifth conductive layer) is disposed on the seventh insulation layer 70. The fifth conductive layer may include a third gate electrode G3.

The eighth insulation layer 80 which cover the third gate electrode G3 is disposed on the seventh insulation layer 70.

A conductive layer (hereinafter, a sixth conductive layer) is disposed on the eighth insulation layer 80. The sixth conductive layer may include a plurality of connection electrodes. FIG. 19 illustrates first, second, and third connection electrodes CNE1, CNE2, and CNE3, for example. The first connection electrode CNE1 is connected to the second electrode D1 of the first transistor T1 through a contact hole CH1 that penetrates through the third, fourth, fifth, sixth, seventh, and eighth insulation layers 30, 40, 50, 60, 70, and 80. The second connection electrode CNE2 is connected to the first electrode S1 of the first transistor T1 through a contact hole CH2 that penetrates through the third, fourth, fifth, sixth, seventh, and eighth insulation layers 30, 30, 40, 50, 60, 70, and 80, and is connected to the first electrode S3 of the third transistor T3 through a contact hole CH3 that penetrates through the seventh insulation layer 70 and the eighth insulation layer 80. The first electrode S1 of the first transistor T1 and the first electrode S3 of the third transistor T3 may be electrically connected by the second connection electrode CNE2. The third connection electrode CNE3 is connected to the second electrode D3 of the third transistor T3 through a contact hole CH4 that penetrates the seventh insulation layer 70 and the eighth insulation layer 80.

In the example shown in FIG. 19, the gate electrode G1 and the first electrode AE1 of the first transistor T1 may form the capacitor Cst. In addition, the first electrode AE1 and the second electrode AE may form the capacitor Chold.

A pixel having such a configuration includes a transistor having an oxide semiconductor as a semiconductor layer, and thus may minimize leakage current at a low driving frequency. In addition, the pixel may operate at a high driving frequency by separating in time a period in which the threshold voltage of the driving transistor in the circuit unit is compensated from a period in which charges corresponding to data are charged to the capacitor. Accordingly, the display device may operate at various driving frequencies.

While this invention has been described with reference to exemplary embodiments thereof, it will be clear to those of ordinary skill in the art to which the invention pertains that various changes and modifications may be made to the described embodiments without departing from the spirit and technical area of the invention as defined in the appended claims and their equivalents. Therefore, the scope of the present invention shall not be restricted or limited by the foregoing description, but be determined by the broadest permissible interpretation of the following claims.

What is claimed is:

1. A pixel comprising:

a first transistor comprising a first electrode electrically connected to a first voltage line which receives a first voltage, a second electrode, and a gate electrode;

a first capacitor connected between a first node and the gate electrode of the first transistor;

a light emitting diode comprising a first electrode electrically connected to the second electrode of the first transistor, and a second electrode connected to a second voltage line which receives a second voltage;

a second transistor comprising a first electrode electrically connected to the gate electrode of the first transistor, a second electrode connected to a third voltage line, and a gate electrode which receives a first scan signal; and a third transistor comprising a first electrode electrically connected to the first electrode of the first transistor, a second electrode connected to the first node, and a gate electrode which receives a second scan signal, wherein an initialization voltage provided from the third voltage line is provided to the gate electrode of the first transistor through the second transistor during each of an initialization period and a compensation period, wherein the third transistor is in a turn-on state in each of the initialization period and the compensation period, wherein one frame comprises a driving period and a bias period, wherein the driving period comprises the initialization period and the compensation period, and the second transistor is in a turn-off state during the bias period.

2. The pixel according to claim 1, further comprising:

a fourth transistor comprising a first electrode connected to a data line, a second electrode connected to the first electrode of the first transistor, and a gate electrode which receives a third scan signal; and a fifth transistor comprising a first electrode connected to the first voltage line, a second electrode connected to the first electrode of the first transistor, and a gate electrode which receives a first light emission control signal;

a sixth transistor comprising a first electrode connected to the second electrode of the first transistor, a second electrode connected to the first electrode of the light emitting diode, and a gate electrode which receives a second light emission control signal; and a seventh transistor comprising a first electrode connected to the first electrode of the light emitting diode, a second electrode connected to a fourth voltage line, and a gate electrode which receives a fourth scan signal.

3. The pixel according to claim 2, wherein, during the initialization period, the fifth transistor is turned on and a first driving voltage of the first voltage line is transferred to the first node through the fifth transistor and the third transistor.

4. The pixel according to claim 2, wherein the sixth and seventh transistors are turned on during the compensation period, and wherein a voltage difference between opposite ends of the first capacitor corresponds to a threshold voltage of the first transistor.

5. The pixel according to claim 1, wherein the first transistor is a P-type transistor, and each of the second transistor and the third transistor is an N-type transistor.

6. A pixel comprising:

a first transistor comprising a first electrode electrically connected to a first voltage line which receives a first voltage, a second electrode, and a gate electrode;

a first capacitor connected between a first node and the gate electrode of the first transistor;

a light emitting diode comprising a first electrode electrically connected to the second electrode of the first transistor, and a second electrode connected to a second voltage line which receives a second voltage;

a second transistor comprising a first electrode electrically connected to the gate electrode of the first transistor, a second electrode connected to a third voltage line, and a gate electrode which receives a first scan signal;

a third transistor comprising a first electrode electrically connected to the first electrode of the first transistor, a second electrode connected to the first node, and a gate electrode which receives a second scan signal; and a fifth transistor comprising a first electrode connected to the first voltage line, a second electrode connected to the first electrode of the first transistor, and a gate electrode which receives a first light emission control signal;

wherein an initialization voltage provided from the third voltage line is provided to the gate electrode of the first transistor through the second transistor during each of an initialization period and a compensation period, wherein the third transistor is in a turn-on state in each of the initialization period and the compensation period, wherein, during the initialization period, the fifth transistor is turned on and a first driving voltage of the first voltage line is transferred to the first node through the fifth transistor and the third transistor.

7. A pixel comprising:

a first transistor comprising a first electrode electrically connected to a first voltage line which receives a first voltage, a second electrode, and a gate electrode;

a first capacitor connected between a first node and the gate electrode of the first transistor;

a light emitting diode comprising a first electrode electrically connected to the second electrode of the first transistor, and a second electrode connected to a second voltage line which receives a second voltage;

a second transistor comprising a first electrode electrically connected to the gate electrode of the first transistor, a second electrode connected to a third voltage line, and a gate electrode which receives a first scan signal;

a third transistor comprising a first electrode electrically connected to the first electrode of the first transistor, a second electrode connected to the first node, and a gate electrode which receives a second scan signal, a sixth transistor comprising a first electrode connected to the second electrode of the first transistor, a second electrode connected to the first electrode of the light emitting diode, and a gate electrode which receives a second light emission control signal; and a seventh transistor comprising a first electrode connected to the first electrode of the light emitting diode, a second electrode connected to a fourth voltage line, and a gate electrode which receives a fourth scan signal, wherein an initialization voltage provided from the third voltage line is provided to the gate electrode of the first transistor through the second transistor during each of an initialization period and a compensation period, wherein the third transistor is in a turn-on state in each of the initialization period and the compensation period, wherein the sixth and seventh transistors are turned on during the compensation period, and wherein a voltage difference between opposite ends of the first capacitor corresponds to a threshold voltage of the first transistor.

* * * * *